US010360421B1

(12) United States Patent
Farrell

(10) Patent No.: US 10,360,421 B1
(45) Date of Patent: Jul. 23, 2019

(54) ASSET MANAGEMENT USING AN ASSET TAG DEVICE

(71) Applicant: Enovate Medical, LLC, Murfreesboro, TN (US)

(72) Inventor: Arlow Farrell, Murfreesboro, TN (US)

(73) Assignee: Enovate Medical, LLC, Murfreesboro, TN (US)

( * ) Notice: Subject to any disclaimer, the term of this patent is extended or adjusted under 35 U.S.C. 154(b) by 0 days.

(21) Appl. No.: 16/247,749

(22) Filed: Jan. 15, 2019

Related U.S. Application Data

(63) Continuation of application No. 15/629,105, filed on Jun. 21, 2017, which is a continuation of application No. 14/961,509, filed on Dec. 7, 2015, now Pat. No. 9,734,682, application No. 16/247,749, which is a continuation of application No. 14/961,735, filed on Dec. 7, 2015, and a continuation of application No. 14/961,730, filed on Dec. 7, 2015.

(60) Provisional application No. 62/146,084, filed on Apr. 10, 2015, provisional application No. 62/127,211, filed on Mar. 2, 2015.

(51) Int. Cl.
  *G06K 7/10* (2006.01)
  *H04W 4/80* (2018.01)
(52) U.S. Cl.
  CPC .......... *G06K 7/10366* (2013.01); *H04W 4/80* (2018.02)
(58) Field of Classification Search
  USPC ....................................................... 235/451
  See application file for complete search history.

(56) References Cited

U.S. PATENT DOCUMENTS

| 5,805,674 A | 9/1998 | Anderson, Jr. |
| 6,104,295 A | 8/2000 | Gaisser et al. |
| 6,154,139 A | 11/2000 | Heller |

(Continued)

FOREIGN PATENT DOCUMENTS

WO    2015/117112 A1    8/2015

OTHER PUBLICATIONS

"Gatekeeper, ""Protect Your Privacy""", Feb. 18, 2015, Untethered Labs, Inc., 5000 College Avenue, College Park, MD, 20740, U.S.A. www.gkchain.com".

(Continued)

*Primary Examiner* — Michael G Lee
*Assistant Examiner* — David Tardif
(74) *Attorney, Agent, or Firm* — Waller Lansden Dortch & Davis LLP; Matthew C. Cox

(57) ABSTRACT

A method that includes scanning for Bluetooth Low Energy (BLE) broadcasts from beacon devices located at fixed locations, filtering the BLE broadcasts to generate a subset of the BLE broadcasts based on signal strength of the respective BLE broadcast or an identifier indicating an unapproved device transmitted the BLE broadcast, identifying within the subset of the BLE broadcasts a first BLE broadcast with a first data packet indicating that a first beacon device is within a specified distance from the asset tag manager, parsing the first data packet to locate a first beacon identifier associated with the first beacon device, creating a second data packet with the first beacon identifier and an asset tag identifier associated with the asset, and transmitting a first wireless broadcast including the second data packet, where the first wireless broadcast is received by a hub.

30 Claims, 10 Drawing Sheets

(56) References Cited

U.S. PATENT DOCUMENTS

| | | |
|---|---|---|
| 6,400,754 B2 | 6/2002 | Fleming et al. |
| 6,433,689 B1 | 8/2002 | Hovind et al. |
| 6,462,656 B2 | 10/2002 | Ulrich et al. |
| 6,529,164 B1 | 3/2003 | Carter |
| 6,577,275 B2 | 6/2003 | Turner |
| 6,657,586 B2 | 12/2003 | Turner |
| 6,725,051 B2 | 4/2004 | Fidler |
| 6,804,647 B1 | 10/2004 | Heck et al. |
| 6,838,992 B2 | 1/2005 | Tenarvitz |
| 6,892,054 B2 | 5/2005 | Belcher et al. |
| 6,957,337 B1 | 10/2005 | Chainer et al. |
| 6,961,448 B2 | 11/2005 | Nichols et al. |
| 6,963,289 B2 | 11/2005 | Aljadeff et al. |
| 6,965,777 B1 | 11/2005 | Cast et al. |
| 6,968,194 B2 | 11/2005 | Aljadeff et al. |
| 6,971,029 B1 | 11/2005 | Avery, IV et al. |
| 6,976,269 B1 | 12/2005 | Avery, IV et al. |
| 6,977,612 B1 | 12/2005 | Bennett |
| 6,988,075 B1 | 1/2006 | Hacker |
| 7,072,671 B2 | 7/2006 | Leitch |
| 7,139,581 B2 | 11/2006 | Berliner et al. |
| 7,190,271 B2 | 3/2007 | Boyd |
| 7,196,662 B2 | 3/2007 | Misikangas et al. |
| 7,209,752 B2 | 4/2007 | Myllymaki et al. |
| 7,212,159 B2 | 5/2007 | Dooley |
| 7,212,563 B2 | 5/2007 | Boyd et al. |
| 7,218,229 B2 | 5/2007 | Boyd |
| 7,218,941 B1 | 5/2007 | Kubo et al. |
| 7,260,835 B2 | 8/2007 | Bajikar |
| 7,283,423 B2 | 10/2007 | Holm et al. |
| 7,295,115 B2 | 11/2007 | Aljadeff et al. |
| 7,295,988 B1 | 11/2007 | Reeves |
| 7,312,752 B2 | 12/2007 | Smith et al. |
| 7,336,563 B2 | 2/2008 | Holm |
| 7,349,683 B2 | 3/2008 | Misikangas et al. |
| 7,352,652 B2 | 4/2008 | Holm et al. |
| 7,403,108 B2 | 7/2008 | Aljadeff et al. |
| 7,477,904 B2 | 1/2009 | Evans et al. |
| 7,497,370 B2 * | 3/2009 | Allen ............... A01K 11/008 235/375 |
| 7,504,928 B2 | 3/2009 | Nierenberg et al. |
| 7,518,502 B2 | 4/2009 | Austin et al. |
| 7,522,049 B2 | 4/2009 | Aljadeff et al. |
| 7,535,796 B2 | 5/2009 | Holm et al. |
| 7,545,326 B2 | 6/2009 | Caliri et al. |
| 7,565,147 B2 | 7/2009 | Simons et al. |
| 7,577,444 B2 | 8/2009 | Bird et al. |
| 7,587,207 B2 | 9/2009 | Davies et al. |
| 7,602,338 B2 | 10/2009 | Smith et al. |
| 7,616,156 B2 | 11/2009 | Smith et al. |
| 7,619,532 B2 | 11/2009 | Amir |
| 7,626,545 B2 | 12/2009 | Smith et al. |
| 7,679,523 B2 | 3/2010 | Leitch et al. |
| 7,689,682 B1 | 3/2010 | Eldering et al. |
| 7,714,710 B2 | 5/2010 | Schwartz |
| 7,729,707 B2 | 6/2010 | Aljadeff et al. |
| 7,840,227 B2 | 11/2010 | Kahlert et al. |
| 7,864,633 B2 | 1/2011 | Holm et al. |
| 7,868,754 B2 | 1/2011 | Salvat, Jr. |
| 7,884,712 B2 | 2/2011 | Nierenberg et al. |
| 7,899,006 B2 | 3/2011 | Boyd |
| 7,904,097 B2 | 3/2011 | Misikangas |
| 7,916,026 B2 | 3/2011 | Johnson et al. |
| 7,941,096 B2 | 5/2011 | Perkins et al. |
| 7,962,155 B2 | 6/2011 | Ghosh |
| 7,969,820 B2 | 6/2011 | Booj et al. |
| 8,018,584 B1 | 9/2011 | Amir |
| 8,031,120 B2 | 10/2011 | Smith et al. |
| 8,040,238 B2 | 10/2011 | Perkins |
| 8,089,354 B2 | 1/2012 | Perkins |
| 8,139,945 B1 | 3/2012 | Amir et al. |
| 8,140,258 B1 | 3/2012 | Dempsey |
| 8,208,939 B2 | 6/2012 | Aljadeff et al. |
| 8,265,191 B2 | 9/2012 | Bowman et al. |
| 8,265,656 B2 | 9/2012 | Misikangas |
| 8,270,994 B2 | 9/2012 | Misikangas et al. |
| 8,285,564 B2 | 10/2012 | Perkins |
| 8,290,437 B2 | 10/2012 | Simons et al. |
| 8,301,330 B2 | 10/2012 | Nielsen |
| 8,310,364 B2 | 11/2012 | Derks et al. |
| 8,319,635 B2 | 11/2012 | Perkins et al. |
| 8,360,975 B1 | 1/2013 | Schieterman et al. |
| 8,368,540 B2 | 2/2013 | Perkins et al. |
| 8,378,815 B1 | 2/2013 | McNulty et al. |
| 8,416,072 B2 | 4/2013 | Tenarvitz |
| 8,417,215 B2 | 4/2013 | Baldus et al. |
| 8,441,367 B1 | 5/2013 | Lee et al. |
| 8,456,364 B2 | 6/2013 | Misikangas et al. |
| 8,457,656 B2 | 6/2013 | Perkins et al. |
| 8,463,619 B2 | 6/2013 | Scarola |
| 8,478,290 B2 | 7/2013 | Yoeli |
| 8,514,071 B2 | 8/2013 | Derks et al. |
| 8,576,829 B2 | 11/2013 | Aljadeff et al. |
| 8,621,554 B1 | 12/2013 | Yu et al. |
| 8,626,183 B2 | 1/2014 | Rosenfeld |
| 8,633,806 B2 | 1/2014 | Amir |
| 8,686,851 B2 | 4/2014 | Davis |
| 8,767,672 B2 | 7/2014 | Soomro et al. |
| 8,768,343 B2 | 7/2014 | Wisherd |
| 8,786,495 B2 | 7/2014 | Wisherd et al. |
| 8,792,305 B2 | 7/2014 | Booj et al. |
| 8,842,002 B2 | 9/2014 | Rado |
| 8,867,993 B1 | 10/2014 | Perkins et al. |
| 8,887,307 B2 | 11/2014 | Chen |
| 8,907,764 B1 | 12/2014 | Amir et al. |
| 8,938,255 B2 | 1/2015 | Tsruya et al. |
| 8,942,298 B2 | 1/2015 | Holm et al. |
| 9,041,529 B2 | 5/2015 | Booj et al. |
| 9,060,000 B2 | 6/2015 | Kaplan et al. |
| 9,064,225 B2 | 6/2015 | Nakara et al. |
| 9,069,058 B2 | 6/2015 | Booj et al. |
| 9,086,469 B2 | 6/2015 | Perkins et al. |
| 9,082,091 B2 | 7/2015 | Doraiswamy et al. |
| 9,092,834 B2 | 7/2015 | Tolmie et al. |
| 9,104,788 B2 | 8/2015 | Friedman et al. |
| 9,177,125 B2 | 11/2015 | Steeves et al. |
| 9,209,909 B2 | 12/2015 | Booj et al. |
| 9,219,984 B1 | 12/2015 | Amir et al. |
| 9,231,699 B1 | 1/2016 | Amir et al. |
| 9,253,727 B1 | 2/2016 | Luna, Jr. et al. |
| 9,261,581 B2 | 2/2016 | Booj et al. |
| 9,264,099 B1 | 2/2016 | Sapio et al. |
| 9,298,958 B1 | 3/2016 | Amir |
| 9,306,665 B1 | 4/2016 | Amir |
| 9,307,554 B2 | 4/2016 | Raphaeli et al. |
| 9,310,207 B2 | 4/2016 | Booj et al. |
| 9,313,135 B2 | 4/2016 | Booj et al. |
| 9,330,235 B2 | 5/2016 | Walton, III |
| 9,341,700 B2 | 5/2016 | Amir et al. |
| 9,350,717 B1 | 5/2016 | Siddiqui |
| 9,363,324 B2 | 6/2016 | Coch et al. |
| 9,374,667 B1 | 6/2016 | Jorgensen et al. |
| 9,378,386 B1 | 6/2016 | Saylord et al. |
| 9,380,421 B1 | 6/2016 | Vltavsky |
| 9,398,007 B1 | 7/2016 | Wegener et al. |
| 9,445,226 B2 | 9/2016 | Castagnoli et al. |
| 9,497,428 B2 | 11/2016 | Gaisser et al. |
| 9,507,012 B2 | 11/2016 | Barssil et al. |
| 9,510,146 B1 | 11/2016 | Amir et al. |
| 9,544,236 B2 | 1/2017 | Booj et al. |
| 9,560,619 B2 | 1/2017 | Pijl |
| 9,569,605 B1 | 2/2017 | Schneider et al. |
| 9,584,965 B2 | 2/2017 | Good et al. |
| 9,589,462 B1 | 3/2017 | Amir |
| 9,594,151 B1 | 3/2017 | Teicher |
| 9,614,921 B2 | 4/2017 | Vangroff et al. |
| 9,622,030 B1 | 4/2017 | Amir et al. |
| 9,632,898 B2 | 4/2017 | Aljadeff |
| 9,633,551 B2 | 4/2017 | Aljadeff et al. |
| 9,641,526 B1 | 5/2017 | Gopalakrishnan et al. |
| 9,641,969 B2 | 5/2017 | Theurer et al. |
| 9,652,955 B1 | 5/2017 | Ray et al. |
| 9,660,768 B2 | 5/2017 | Sapio et al. |
| 9,684,054 B2 | 6/2017 | Wisherd et al. |

(56) References Cited

U.S. PATENT DOCUMENTS

| | | | |
|---|---|---|---|
| 9,699,680 B2 | 7/2017 | Wisherd | |
| 9,702,707 B2 | 7/2017 | Goldman et al. | |
| 9,712,975 B2 | 7/2017 | Agarwal et al. | |
| 9,734,295 B1 | 8/2017 | Movva | |
| 9,734,682 B2* | 8/2017 | Miller | G08B 13/2417 |
| 9,769,166 B1 | 9/2017 | Lai et al. | |
| 9,773,020 B2 | 9/2017 | Kerr et al. | |
| 9,775,157 B2 | 9/2017 | Luna, Jr. et al. | |
| 9,781,613 B2 | 10/2017 | Alberte, Jr. et al. | |
| 9,788,167 B2 | 10/2017 | Geng et al. | |
| 9,794,904 B1 | 10/2017 | Amir et al. | |
| 9,823,342 B2 | 11/2017 | Cook et al. | |
| 9,858,797 B2 | 1/2018 | Cai et al. | |
| 9,860,882 B2 | 1/2018 | Sapio et al. | |
| 9,880,283 B2 | 1/2018 | Richardson et al. | |
| 9,922,167 B2 | 3/2018 | Tenarvitz et al. | |
| 9,934,373 B1 | 4/2018 | Ziraknejad et al. | |
| 9,939,512 B1 | 4/2018 | Amir et al. | |
| 9,949,085 B2 | 4/2018 | Freeman-Baer et al. | |
| 9,961,507 B1 | 5/2018 | Mendelson | |
| 9,992,633 B2 | 6/2018 | Geng et al. | |
| 2002/0138598 A1 | 9/2002 | Bade et al. | |
| 2002/0194500 A1 | 12/2002 | Bajikar | |
| 2003/0067392 A1 | 4/2003 | Monroe | |
| 2003/0146835 A1 | 8/2003 | Carter | |
| 2003/0225596 A1 | 12/2003 | Richardson et al. | |
| 2004/0003081 A1 | 1/2004 | Justus et al. | |
| 2004/0111621 A1 | 6/2004 | Himberger et al. | |
| 2004/0143458 A1 | 7/2004 | Pulkkinen et al. | |
| 2004/0203748 A1 | 10/2004 | Kappes et al. | |
| 2004/0223617 A1 | 11/2004 | Corcoran et al. | |
| 2004/0255081 A1 | 12/2004 | Arnouse | |
| 2005/0010796 A1 | 1/2005 | Arnouse | |
| 2005/0062603 A1 | 3/2005 | Fuerst et al. | |
| 2005/0066179 A1 | 3/2005 | Seidlein | |
| 2005/0210270 A1 | 9/2005 | Rohatgi et al. | |
| 2005/0277872 A1 | 12/2005 | Colby, Jr. et al. | |
| 2006/0026043 A1 | 2/2006 | Schneider et al. | |
| 2006/0145815 A1* | 7/2006 | Lanzieri | G06K 7/0008 340/10.2 |
| 2006/0287813 A1 | 12/2006 | Quigley | |
| 2006/0290519 A1 | 12/2006 | Boate et al. | |
| 2007/0004381 A1 | 1/2007 | Larson et al. | |
| 2007/0098230 A1 | 5/2007 | Norita et al. | |
| 2007/0186106 A1 | 8/2007 | Ting et al. | |
| 2007/0210923 A1 | 9/2007 | Butler et al. | |
| 2007/0217663 A1 | 9/2007 | Iizuka | |
| 2007/0237096 A1 | 10/2007 | Vengroff et al. | |
| 2007/0258626 A1 | 11/2007 | Reiner | |
| 2007/0295807 A1 | 12/2007 | Antos et al. | |
| 2008/0071535 A1 | 3/2008 | Yoshioka et al. | |
| 2008/0183502 A1 | 7/2008 | Dicks et al. | |
| 2008/0186138 A1 | 8/2008 | Butler et al. | |
| 2008/0186139 A1 | 8/2008 | Butler et al. | |
| 2008/0189420 A1 | 8/2008 | Herrod et al. | |
| 2008/0207296 A1 | 8/2008 | Lutnick et al. | |
| 2008/0211627 A1 | 9/2008 | Shinzaki | |
| 2008/0252459 A1 | 10/2008 | Butler et al. | |
| 2009/0007248 A1 | 1/2009 | Kovaleski | |
| 2009/0097623 A1 | 4/2009 | Bharadwaj | |
| 2009/0115663 A1 | 5/2009 | Brown et al. | |
| 2009/0140043 A1 | 6/2009 | Graves et al. | |
| 2009/0226048 A1 | 9/2009 | Fukuda | |
| 2009/0254975 A1 | 10/2009 | Turnbull et al. | |
| 2009/0271635 A1 | 10/2009 | Liu et al. | |
| 2009/0300704 A1 | 12/2009 | Boberg et al. | |
| 2009/0315735 A1 | 12/2009 | Bhavani et al. | |
| 2010/0024023 A1 | 1/2010 | Bair | |
| 2010/0071044 A1 | 3/2010 | Khan | |
| 2010/0117836 A1 | 5/2010 | Seyed Momen et al. | |
| 2010/0153752 A1 | 6/2010 | Tsukamoto et al. | |
| 2010/0182201 A1 | 7/2010 | Graczyk et al. | |
| 2010/0317371 A1 | 12/2010 | Westerinen et al. | |
| 2011/0029320 A1 | 2/2011 | Jamali et al. | |
| 2011/0121974 A1 | 5/2011 | Tenarvitz et al. | |
| 2011/0125513 A1 | 5/2011 | Tenarvitz et al. | |
| 2011/0140861 A1 | 6/2011 | Amir | |
| 2011/0282799 A1 | 11/2011 | Huston | |
| 2011/0288874 A1 | 11/2011 | Hinkamp | |
| 2012/0050046 A1 | 3/2012 | Satorius | |
| 2012/0088500 A1 | 4/2012 | Bugenhagen et al. | |
| 2012/0182939 A1 | 7/2012 | Rajan et al. | |
| 2012/0185267 A1* | 7/2012 | Kamen | G06Q 50/22 705/2 |
| 2012/0198570 A1 | 8/2012 | Joa et al. | |
| 2012/0259648 A1 | 10/2012 | Mallon et al. | |
| 2012/0259649 A1 | 10/2012 | Mallon et al. | |
| 2012/0259650 A1 | 10/2012 | Mallon et al. | |
| 2012/0259651 A1 | 10/2012 | Mallon et al. | |
| 2012/0259652 A1 | 10/2012 | Mallon et al. | |
| 2012/0290950 A1 | 11/2012 | Rapaport et al. | |
| 2013/0122807 A1 | 5/2013 | Tenarvitz et al. | |
| 2013/0125226 A1 | 5/2013 | Shah et al. | |
| 2013/0154844 A1 | 6/2013 | Montgomery et al. | |
| 2013/0166193 A1 | 6/2013 | Goldman et al. | |
| 2013/0173470 A1 | 7/2013 | Nuzzi et al. | |
| 2013/0238599 A1 | 9/2013 | Burris | |
| 2013/0261964 A1 | 10/2013 | Goldman et al. | |
| 2013/0262155 A1 | 10/2013 | Hinkamp | |
| 2013/0283350 A1 | 10/2013 | Afek et al. | |
| 2013/0326229 A1 | 12/2013 | Eguchi | |
| 2014/0099921 A1 | 4/2014 | Weiss | |
| 2014/0102859 A1 | 4/2014 | Aby-Eva | |
| 2014/0122053 A1 | 5/2014 | Lotan et al. | |
| 2014/0126770 A1 | 5/2014 | Odessky et al. | |
| 2014/0155098 A1 | 6/2014 | Markham et al. | |
| 2014/0156104 A1 | 6/2014 | Healey et al. | |
| 2014/0180713 A1 | 6/2014 | Tenarvitz et al. | |
| 2014/0259129 A1 | 9/2014 | Copsey | |
| 2014/0261058 A1 | 9/2014 | Henderson et al. | |
| 2014/0274127 A1 | 9/2014 | Beidel | |
| 2014/0282018 A1 | 9/2014 | Amble et al. | |
| 2014/0313013 A1 | 10/2014 | de Lorenzo | |
| 2014/0329536 A1 | 11/2014 | Tian et al. | |
| 2014/0337053 A1 | 11/2014 | Smith | |
| 2014/0343846 A1 | 11/2014 | Goldman et al. | |
| 2014/0368334 A1 | 12/2014 | Tian et al. | |
| 2014/0372147 A1 | 12/2014 | White | |
| 2015/0066901 A1 | 3/2015 | Burris et al. | |
| 2015/0066916 A1 | 3/2015 | Burris et al. | |
| 2015/0067880 A1 | 3/2015 | Ward et al. | |
| 2015/0081335 A1 | 3/2015 | Dixon et al. | |
| 2015/0084769 A1 | 3/2015 | Messier et al. | |
| 2015/0113074 A1 | 4/2015 | Marcus | |
| 2015/0168543 A1 | 6/2015 | Tian et al. | |
| 2015/0169911 A1 | 6/2015 | Tian et al. | |
| 2015/0178846 A1 | 6/2015 | Feinschreiber et al. | |
| 2015/0223891 A1 | 8/2015 | Miller et al. | |
| 2015/0223892 A1 | 8/2015 | Miller et al. | |
| 2015/0227127 A1 | 8/2015 | Miller et al. | |
| 2015/0235477 A1 | 8/2015 | Simkin et al. | |
| 2015/0245095 A1 | 8/2015 | Gonzalez | |
| 2015/0264564 A1 | 9/2015 | Vanderhulst et al. | |
| 2015/0264573 A1 | 9/2015 | Giordano et al. | |
| 2015/0278830 A1 | 10/2015 | Zamer et al. | |
| 2016/0012375 A1 | 1/2016 | Hanson et al. | |
| 2016/0012409 A1 | 1/2016 | Hanson et al. | |
| 2016/0012412 A1 | 1/2016 | Scanlon et al. | |
| 2016/0012484 A1 | 1/2016 | Hanson et al. | |
| 2016/0012496 A1 | 1/2016 | Hanson et al. | |
| 2016/0012505 A1 | 1/2016 | Hanson et al. | |
| 2016/0012655 A1 | 1/2016 | Hanson et al. | |
| 2016/0019889 A1 | 1/2016 | Alvarez Guevara et al. | |
| 2016/0026837 A1 | 1/2016 | Good et al. | |
| 2016/0054865 A1 | 2/2016 | Kerr et al. | |
| 2016/0093108 A1 | 3/2016 | Mao et al. | |
| 2016/0110467 A1 | 4/2016 | Hem | |
| 2016/0117458 A1 | 4/2016 | Hermans et al. | |
| 2016/0150041 A1 | 5/2016 | Bolinger | |
| 2016/0165056 A1 | 6/2016 | Bargetzi et al. | |
| 2016/0171486 A1 | 6/2016 | Wagner et al. | |
| 2016/0189132 A1 | 6/2016 | Cash et al. | |
| 2016/0212125 A1 | 7/2016 | Pender | |
| 2016/0212144 A1 | 7/2016 | Pender | |

(56) References Cited

U.S. PATENT DOCUMENTS

| | | |
|---|---|---|
| 2016/0234651 A1 | 8/2016 | Marcus |
| 2016/0261658 A1 | 9/2016 | Taylor et al. |
| 2016/0267093 A1 | 9/2016 | Jimenez |
| 2016/0267237 A1 | 9/2016 | Tenarvitz et al. |
| 2016/0278652 A1 | 9/2016 | Kaib et al. |
| 2016/0286624 A1 | 9/2016 | Patel et al. |
| 2016/0335686 A1 | 11/2016 | AthuluruTlrumala et al. |
| 2017/0006162 A1 | 1/2017 | Bargetzi et al. |
| 2017/0138742 A1 | 5/2017 | Teicher |
| 2017/0262719 A1 | 9/2017 | Yamazaki et al. |
| 2018/0067200 A1 | 3/2018 | Cook et al. |
| 2018/0096179 A1 | 4/2018 | Dang et al. |

OTHER PUBLICATIONS

"Chris Hoffman, ""How to Unlock Your Computer with Your Phone or Watch"", Jul. 24, 2015, How-To Geek, LLC, Herndon, VA, U .SA http://www.howtogeek.com/222924/how-to-unlock-your-computer-with-your-phone--0r-watch/".

"Krohn, et al., ""Best Practices From the Mobile Frontier"", mHealth Innovation, 2014, p. 10, Healthcare Information and Management Systems Society (HIMSS), 33 West Monroe Street, Suite 1700, Chicago, IL 60603-5616https://books.google.com/".

"Lindh, Joakim, ""The key to using Bluetooth Smart in asset tracking"", Jan. 5, 2015, Electronic Component NewsECN), U.S.A. http://www.ecnmag.com/blog/2015/01/key-using-bluetooth-smart-asset-tracking".

openbeacon.org, "About the OpenBeacon project", Oct. 16, 2014. http://get.openbeacon.org/about.html, Berlin.

"Weber, Joanna, ""Smart Asset Management—Beacons as a Tracking Solution"", Jul. 23, 2015, Minodes GmbH, 137Varick Street, 2nd Floor, New York, NY 10013, U.S.A. https://www.minodes.com/blog/smart-asset-management".

"spreo.co, ""Indoor Navigation & Positioning Technology"", Sep. 18, 2015, SPREO Indoor Location Solutions, 902Broadway, FI 6, New York, NY 10010, U.S.A. http://spreo.co/lechnology/bluetooth-asset-tracking-technology/".

"CenTrak, ""Innovation Products"", Feb. 27, 2015, CenTrak Inc., 125 Pheasant Run, New1own, PA 18940, U.S.A. http:/NWW.centrak.com/products/".

"CenTrak, ""Innovation Clinical-Grade Visibility"", Feb. 27, 2015, CenTrak Inc., 125 Pheasant Run, New1own, PA18940, U.S.A. http://www.centrak.com/clinical-grade-locating/".

"CenTrak, ""Innovation Multi-Mode Technology"", Feb. 27, 2015, CenTrak Inc., 125 Pheasant Run, New1own, PA18940, U.S.A. http://www.centrak.com/multi-mode-tech/".

"Quuppa, ""Unique Technology,"" Feb. 19, 2015, Quuppa Oy, Keilaranta 1, 02150 Espoo, Finland. http://quuppa.com/echnology/".

"Quuppa, ""Key Features,"" Feb. 19, 2015, Quuppa Oy, Keilaranta 1, 02150 Espoo, Finland. http://quuppa.com/eatures/".

"Cardinal Heal th, ""Effective inventory management is about much more than keeping the shelves stocked,"" Cardinal Health Inventory Management Solutions, Sep. 9, 2015, Cardinal Health, 7000 Cardinal Place, Dublin, OHB017, U.S.A. http://www.cardinalhealth.com/en/services/acute/business-solutions/operational-solutions/inventorymanagement-services/cardinal-health-inventory-management-solutions.html".

* cited by examiner

ASSET MANAGEMENT USING AN ASSET TAG DEVICE

RELATED APPLICATIONS

This application is a continuation of, and claims the benefit of, U.S. patent application Ser. No. 15/629,105, entitled ASSET MANAGEMENT USING AN ASSET TAG DEVICE, filed Jun. 21, 2017; which is a continuation of U.S. patent application Ser. No. 14/961,509 (now U.S. Pat. No. 9,734,682), entitled ASSET MANAGEMENT USING AN ASSET TAG DEVICE, filed Dec. 7, 2015; which claims the benefit of U.S. Provisional Application No. 62/146,084, entitled ASSET MANAGEMENT SYSTEM, filed Apr. 10, 2015; and U.S. Provisional Application No. 62/127,211, entitled ASSET MANAGEMENT SYSTEM, filed Mar. 2, 2015. This application is also a continuation of, and claims the benefit of, U.S. patent application Ser. No. 14/961,735, entitled COMMUNICATION HUB AND REPEATERS, filed Dec. 7, 2015; which claims the benefit of U.S. Provisional Application No. 62/146,084, entitled ASSET MANAGEMENT SYSTEM, filed Apr. 10, 2015. This application is also a continuation of U.S. patent application Ser. No. 14/961,730, entitled ACCESS CONTROL FOR A HARD ASSET, filed Dec. 7, 2015; which claims the benefit of U.S. Provisional Application No. 62/146,084, entitled ASSET MANAGEMENT SYSTEM, filed Apr. 10, 2015. The entire contents of these applications are incorporated by reference.

BACKGROUND OF THE INVENTION

Asset management systems may be systems used to manage the entire or part of the lifecycle of an asset. An entity may identify assets as objects of value to the entity. Assets may be tangible objects, such as buildings, hardware, devices, etc., or may be intangible objects such as software, information, intellectual property, etc. Asset management systems may help an entity design, deploy, operate, maintain, track, upgrade, and/or dispose of assets. As part of asset management, an entity may use an asset tracking system to identify, track the movement of, and/or manage the entity's assets.

BRIEF DESCRIPTION OF THE DRAWINGS

The present disclosure is illustrated by way of example, and not by limitation, in the figure of the accompanying drawings.

DETAILED DESCRIPTION

Figure 1A:
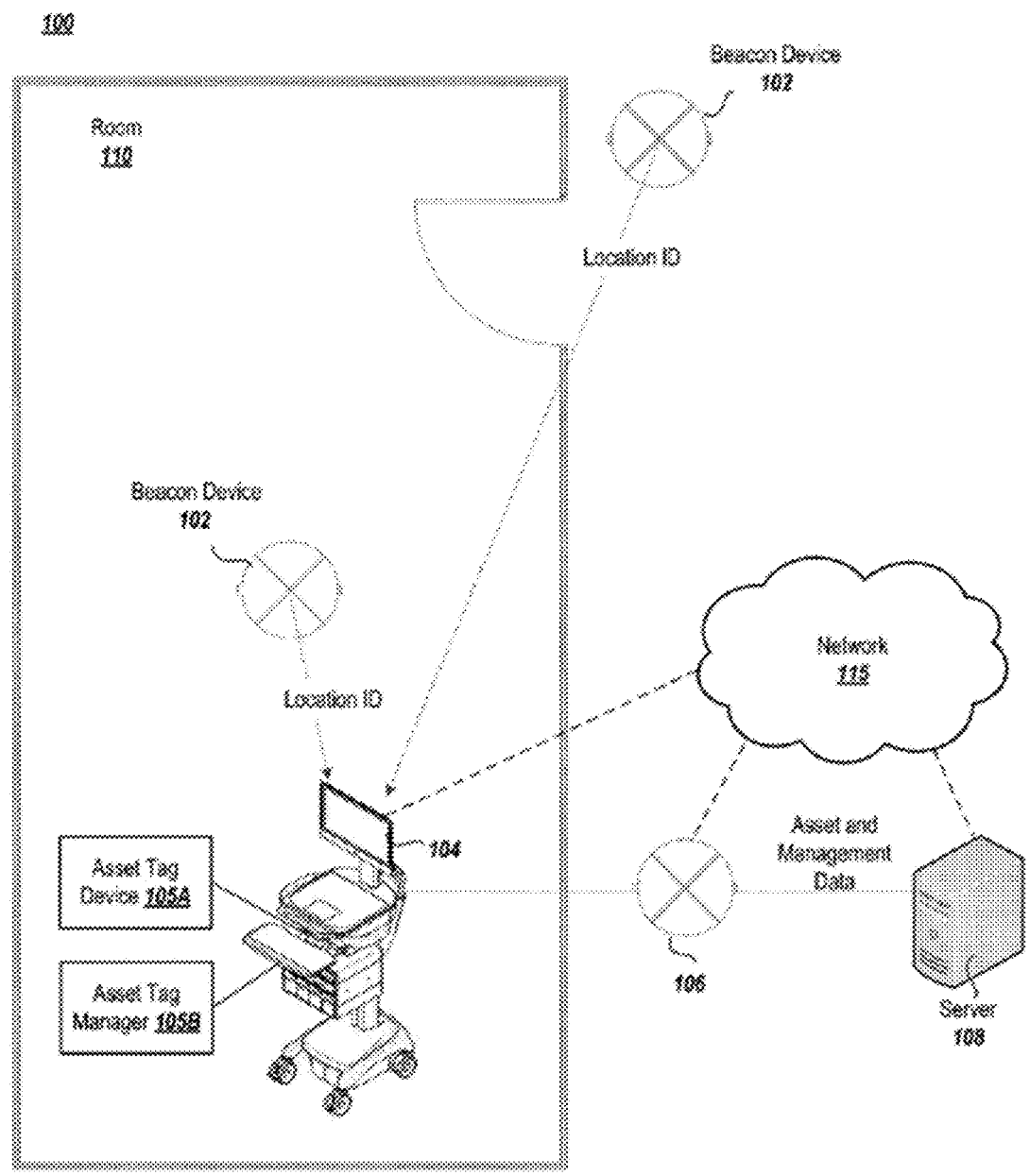
FIG. 1A illustrates a communication flow of asset and management information in a medical management system (MMS) according to various embodiments.

Tracking and managing assets or objects of a large-scale enterprise can be a formidable task. Traditionally, asset tracking and management can be done using a manual inventory system that can use paperwork to track the movement of the assets or usage of the assets. For example, when an employee checks out equipment, the employee can write down the time the asset was checked out and the time that the asset was checked back in. However, the manual paperwork system for tracking and managing assets can be time-intensive and can introduce a variety of errors. For example, an employee may forget to write down when they checked an asset in or out, fail to return an asset, lie about equipment usage, and so forth.

Electronic asset tracking systems (ATS) can be used to decrease the time-intensiveness and errors associated with manual paperwork systems. For example, an ATS can use barcode labels or radio frequency identification (RFID) tags to track assets. The barcode labels or RFID tags can be attached to each asset and when the asset is checked in or out, the user can scan the barcode label or RFID tag using a scanner. However, a barcode label or an RFID tag may still demand a user to manually scan an asset to track information. For example, a barcode label or RFID tag typically require either movement of assets past scanners (e.g., palettes leaving a warehouse or airline passengers moving past a magnetic detector) or employees walking around a facility to verify manually that the data matches the records (e.g., stock takes). Collection of asset information using a traditional ATS can be difficult. For example, equipment that is on a floor, under desks, behind monitors, and so forth, can have a barcode label or an RFID tags in inconvenient or hard to find locations. Additionally, these techniques can physically locate the asset and can require personnel to physically collect the asset information. Use of manual scanners can be slow and impractical for many environments.

Assets of all kinds may be tracked and may be secured by providing selective access to authorized individuals through authentication of those individuals. The authentication may include second factor authentication, which may be required before an individual gains access to confidential or sensitive information available through a database accessible through the asset. The individuals may be an employee of any organization, military personnel in a military enterprise setting, government workers at any level in government, and medical personnel in a medical facility setting, or the like. When the term "asset" is referred to herein, it may be with relation to an asset accessible by any of these types of employees or personnel that may have access to confidential or sensitive information through different kinds of assets, such as mobile devices, computers, work stations and the like. For clarity and simplified explanation, the present disclosure is primarily described with reference to medical assets in a medical setting.

A medical asset may include equipment such as a medical cart, ventilators, an IV pole, a tablet computer, a battery pack, all in one (AIO) personal computer, and so forth. A military asset may include a mobile or stationary computer, a radio system, a workstation and a weapons system and the like. A government asset may include a mobile or stationary computer, a workstation, an authentication pad and the like.

Because some assets involve computing devices (such as a medical cart, a tablet or personal computer), these assets may provide access to confidential or sensitive patient information records in a medical setting, a military setting, a government setting and in a business setting. Securing access to the assets becomes a challenge when the assets may be distributed throughout a medical facility such as a hospital, nursing home or medical clinic (or a military or government facility) and are generally difficult to keep under constant observation.

The following describes embodiments of an asset management system in the context of a medical management system (MMS) that is used to track medical assets.

FIG. 1A illustrates a communication flow of asset and management information in a medical management system (MMS) 100 according to various embodiments, in addition to aspects of a real-time location system (RTLS) that works with the MMS 100. The communication flow may originate in a location such as an area 110, and may include beacon devices 102 and data sent from an asset 104 (e.g., a medical cart is shown). The asset 104 may be coupled with an asset tag device 105A or may include an asset tag manager 105B that runs on the asset 104 to determine a location of the asset 104. An asset tag device 105A may be an electronic device coupled to an asset or integrated into the asset and used as part of an asset-tracking system (ATS), such as a real-time locating system (RTLS). An asset tag device may be a small (e.g., size of a U.S. quarter), resource-constrained (i.e., low processing power, limited memory, and/or limited battery life) device used to transmit data, such as a beacon identifier, to a more powerful central device. The central device, such as a server computer system (also referred to as a server), may make a determination of location of an asset tag device and/or asset in view of the transmitted data. An asset tag device may be a wireless device and transmit data using a wireless communication protocol. An asset tag device may be a low-power device and/or be battery powered. An asset tag device may use a rechargeable battery, such as a lithium-ion rechargeable battery. An asset tag device may be coupled to or integrated into an asset in a variety of ways. For example, an asset tag device may be a discrete hardware device that is physically fixed to a hard asset. An asset tag device may be a hardware device that is integrated into the hardware of an asset. A third party device, such as a mobile phone, may be converted into an asset tag device by loading the asset tag software (e.g., asset tag manager) and leveraging the hardware of the third party device to perform the functions of the asset tag device.

The data (including the location) may flow through a hub 106 (or other network device) and arrive at a server 108 (such as a medical database and/or an authentication server). In some embodiments, the data also, or alternatively, flows through a communications network 115, where the communications network 115 may include the hub 106. The data flow may also flow in the reverse direction from the server 108 and/or the hub 106 to the asset 104, e.g., in response to a request for medical information or records on a patient. The data may include asset and/or management data, medical information, patient information, authentication data, and other personal and security-related information and the like.

The MMS 100 may include multiple assets 104. The beacon devices 102 may be associated with fixed locations and may provide a location identifier (ID) for asset tag device 105A (or 105B) to detect, such that the asset tag device 105A (or 105B) may determine a current location, which the assets may transmit through the hub 106 to the server 108. The beacon device 102 may identify or be associated with any type of location, including a room, a hallway, a common or conference room, and/or a grid location.

The beacon device 102 may include a circuit board within a housing, the circuit board containing a processor (or discrete logic or controller or microcontroller), memory (non-volatile and/or volatile memory), a battery (or other power source), and a transceiver primarily for transmitting. The beacon device 102 may be programmed to transmit a beacon signal containing data to identify the beacon device to other devices, such as to the asset tag device 105A or to the asset tag manager 105B running on a host machine of the asset 104.

In one example, the beacon device 102 may communicate with the asset tag device 105A and/or the asset tag manager 105B through a personal area network (PAN), such as, e.g., with Bluetooth® technology developed by the Bluetooth Special Interest Group (SIG). In another example, the PAN may be created with Bluetooth® low energy (BLE) technology (also developed by Bluetooth SIG) that may be used to track the assets 104. For example, a BLE-based beacon may be associated with an asset in the MMS 100 to communicate asset and/or management information of the asset.

In another example, the beacon device 102 may be an active or passive radio frequency identification (RFID) tag that transmits a unique RFID number. The RFID number or identifier may be correlated at the server 108 with a certain location such as may have been pre-programmed at the server 108 or within a distributed MMS 100. In this example, the asset tag device 105A and/or the asset tag manager 105B may be or include an interrogator that interrogates the RFID tag of the beacon device 102 to determine the RFID number or identifier of the beacon device 102. When the beacon device 102 is an active RFID tag, the asset tag device 105A and/or the asset tag manger 105B may receive the actively transmitted RFID number of identifier as transmitted by the beacon device 102.

Figure 2:
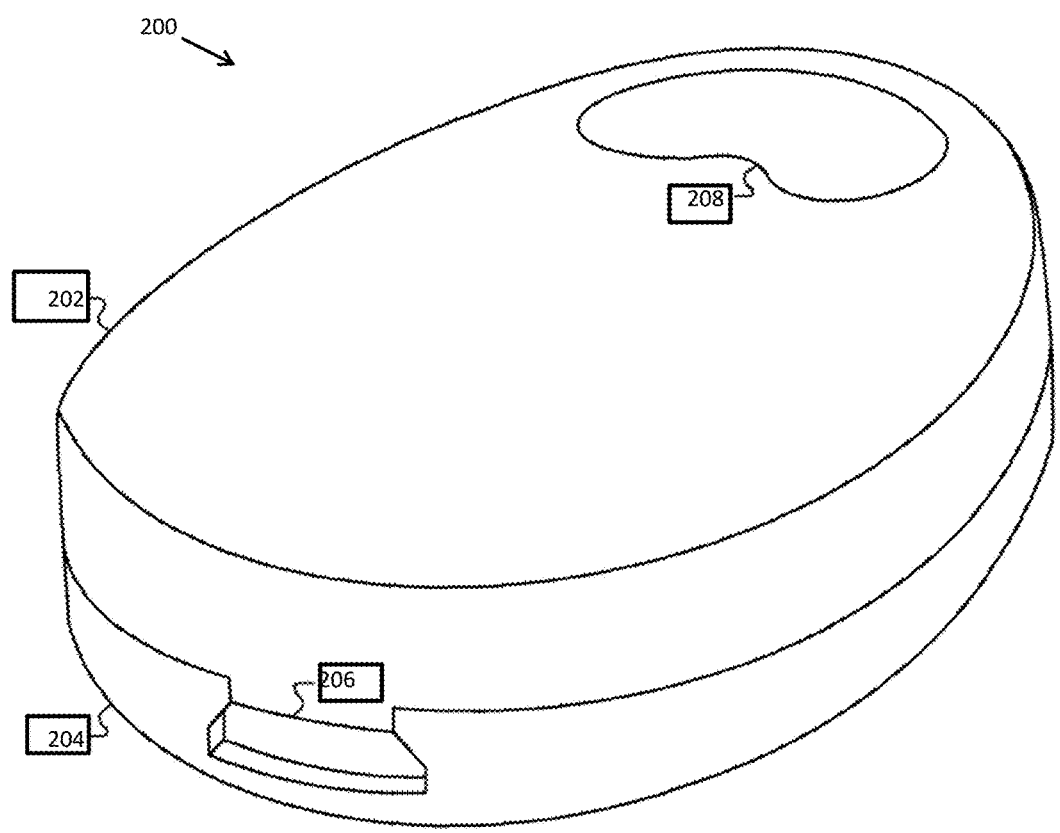
FIG. 2 illustrates an asset tag device, according to another embodiment.

The asset tag device 105A (e.g., a non-integrated asset tag device) may be implemented in hardware and include a circuit board within a housing as depicted in FIG. 2, the circuit board containing a processor, memory (non-volatile and/or volatile memory), a battery, and a transceiver. The transceiver may be a third-party integrated circuit, such as an RF module, e.g., a Bluetooth® chip, an RFID interrogator and/or receiver or the like. The asset tag device may be performed by processing logic comprising hardware, software, firmware or any combination thereof.

The asset tag manager 105B (e.g., an integrated asset tag device) may be a software program (including instructions) that may utilize a processor, memory, transceiver and the like of a host machine of the asset 104, such as the medical cart (all-in-one (AIO)), any medical device in which the asset tag is integrated, or any device when used in non-medical applications.

The asset tag device 105A and/or the assets 104 may be tracked with a real-time location system (RTLS) that determines the location of whatever is tagged (or otherwise tracked by identifying a location of beacon devices 102 in proximity of the assets 104). The tracked entities may include an asset or equipment, a MSM and/or patient(s), for example. The communications hub 106 may be wired or wireless and may direct data between the assets and to (and from) the server 108.

In one example, the beacon device may broadcast a location ID to any device located within the area 110. In this example, when the asset 104 receives the location ID from the beacon device 102, the asset 104 may determine its location. In another example, the asset 104 may measure a received signal strength indication (RSSI) from the beacon device 102 to determine a location of the device within a radius or area for which the beacon device is designated.

For example, the asset 104 may use the received location ID from the beacon device 102 to determine that the asset 104 is located in an identified room. The asset 104 may also use the RSSI to determine a location of the asset 104 within the room, such as within a threshold of location accuracy (e.g., within X distance from the beacon device 102). In one example, a room may include multiple beacon devices 102. The asset 104 may receive multiple location IDs from the multiple beacon devices 102 and use the RSSI of the different location IDs to determine the location of the asset 104 within the room. For example, the asset 104 may use the RSSI of the different location IDs to triangulate the location of the asset 104 in the room. In another example, the beacon device 102 may be located at different locations. For example, the beacon device 102 may be located in a hallway, in a lobby, in a stairwell, in a room, in a parking lot, and so forth. When the asset tag device 105A (or asset tag manager 105B) determines its location, the asset tag device 105A (or asset tag manager 105B) may communicate asset information (such as location information, asset management information, and so forth) to a closest hub 106.

In another example, the asset tag device 105A and/or the asset tag manager 105B can append the location ID to the asset information and communicate the appended asset information to the hub 106. The hub 106 can analyze the appended information to determine the location of the asset 104 using the location ID and the asset information. For example, the hub 106 can access a database that defines the locations of different beacon devices with different location IDs. The hub 106 can compare the received location ID from the asset tag device 105A and/or the asset tag manager 105B with the location IDs in the database to find a matching pair of location IDs and associate the defined location of the location ID with the asset 104.

In one example, the hub 106 may be a device (such as a communication plate) mounted to a wall. In another example, the hub 106 may be integrated into a construction of a location. For example, the hub 106 may be integrated into a floor, ceiling, or wall of a facility, for example. In another example, the hub 106 may be software on the server 108.

In one example, the hub 106 may be located at a different location than the area 110 (such as a central location on the floor where the device is located or a central location in the building where the device is located). When the hub 106 receives the asset information from the asset 104, the hub 106 may relay the information to a server 108. In one example, the hub 106 may receive information from different devices. When the hub 106 receives the information from the different devices, the hub 106 may aggregate the data and send the aggregated asset information to the server 108.

One advantage of the asset tag device 105A (or asset tag manager 105b) determining its location and sending the asset management information to the hub 106 may be to enable the beacon device 102 to be small and low energy. For example, because the beacon device 102 broadcasts the location ID, the beacon device 102 may consume a small amount of power (such as a 1-2 mAh per day) and may be powered by a small battery for an extended period of time. The asset tag device 105A may have a separate power supply that may be recharged more easily than the beacon device 102. Another advantage of the asset tag device 105A (or asset tag manager 105B) communicating the asset information may be that the asset the asset tag device 105A may select the information of the asset tag device 105A to be communicated to the hub 106 and communicate the information in real-time and directly to the hub 106 to reduce communication interference from multiple devices.

In one example, the MMS 100 may track the assets 104 in real-time or substantially real-time. For example, the asset 104 may continuously communicate asset and management information to the hub 106.

In another example, the MMS 100 may track the assets on a periodic basis. For example, the asset 104 may communicate asset and management information to the hub 106 on a periodic basis. In another example, the hub 106 may transmit a request to the asset 104 to communicate the asset and management information. When the asset 104 receives the request, the asset 104 may communicate the asset and management information to the hub 106.

In one example, the MMS may include an implementation system to map a facility where assets may be managed, e.g., determine a schematic or layout of the facility. In another example, the implementation system may include software to determine a schematic or layout of the facility, including rooms, stairway objects, hallway objects, and so forth, based on a digital plan and/or a computer-assisted built plan within the software. In another example, a user may use a scanner, such as a three-dimensional (3D) scanner and walk around the facility collecting layout information, where the software may use the information from the scanner to determine the layout of the facility.

With further reference to FIG. 1, when the implementation software has determined a layout of the facility, the software may associate the beacon device 102 and/or the hub 106 may be associated with the layout of the facility. For example, the beacon devices 102 and/or the hubs 106 in a facility may have a unique ID. When the facility layout is determined, the implementation software may receive input from an input device (such as a mouse, a keyboard, a stylus, a touch screen, and so forth) associating the different unique IDs with locations on the facility layout.

In another example, locations in the facility layout may have unique IDs associated with the location. In this example, an assistance device (such as a scanner or a communication device) may be taken to one or more locations in the facility, where the location ID may be selected, the assistance device may scan or communicate with the beacon device 102 and/or the hub 106, and the beacon device 102 and/or the hub 106 may be associated with the location ID. In another example, when a device is located at a facility location, the assistance device may scan the location for the beacon devices 102 and/or the hubs 106 (such as by using by using Bluetooth® scanning) and associate the beacon device 102 and/or the hub 106 scanner in the location with a location ID. For example, a user may walk into a room with a first location ID, use a tablet with Bluetooth® technology to scan the room for the beacon devices 102 and/or the hubs 106, and the software may associate the beacon devices 102 and/or the hubs 106 detected by the tablet with the first location ID. The user may repeat this process for multiple locations in the facility.

In yet another example, the beacon devices 102 may have a predefined number or identifier (ID). When a layout of the building is compiled, the user may use a graphical user interface (GUI) to select which beacon device is located in each room, hallway, conference room and the like.

An advantage of the implementation of the MMS 100 may be to enable integration of the MMS into a preexisting facility, e.g., the MMS may be installed in a preexisting facility and the implementation system may map the preexisting facility. Another advantage of the MMS may be that the installation and implementation of the MMS may enable quick and efficient installation as the MMS may be installed and configured for a facility without invasively installing an asset management system. Another advantage of the MMS may be that the system may avoid interference by other devices by using the implementation system to determine optimal locations of the beacon devices 102 and/or the hubs 106.

Figure 1B:
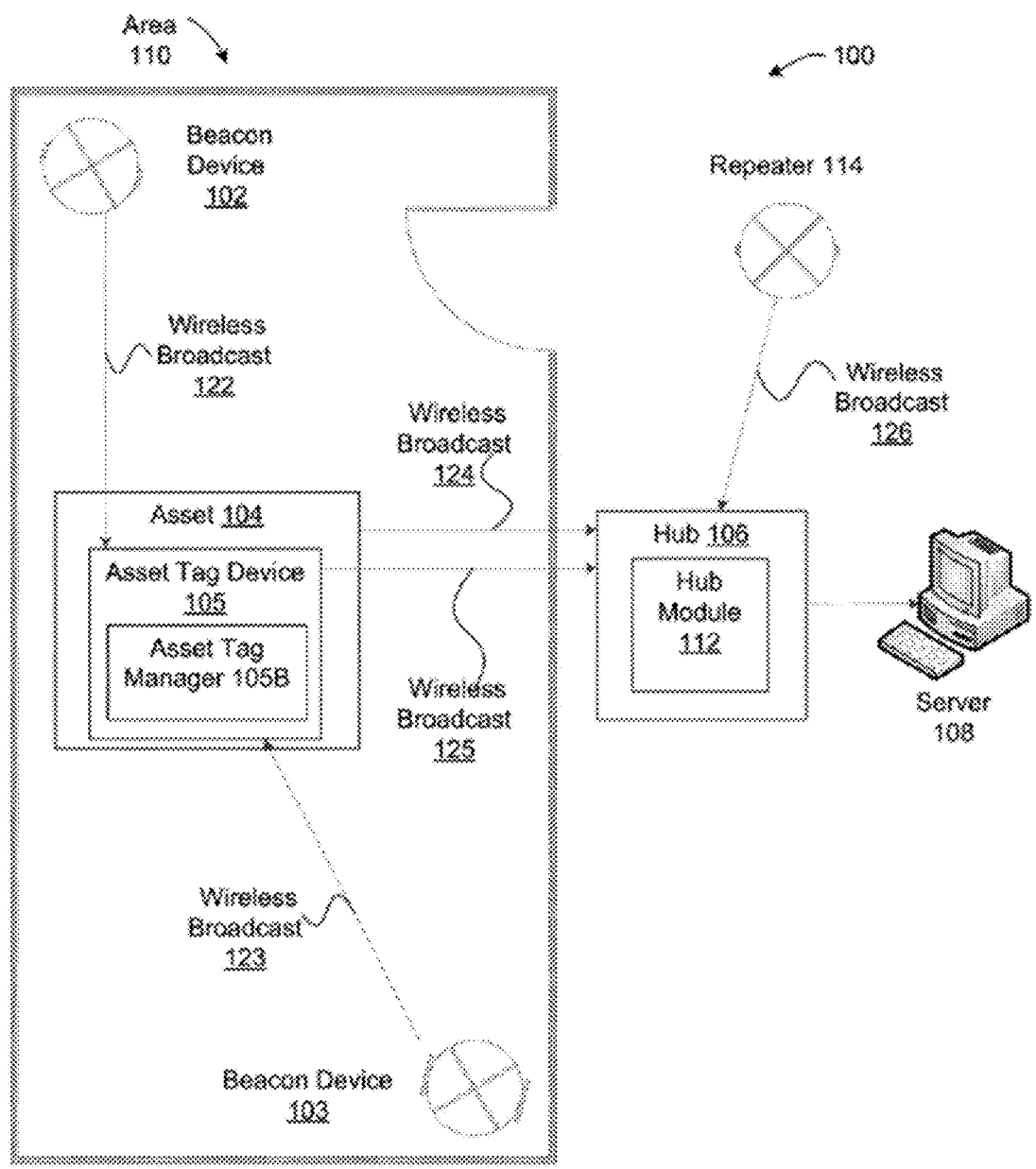
FIG. 1B illustrates an asset management system, according to one embodiment.

The asset management system can be used in other contexts, as described with respect to FIG. 1B. The details regarding the asset tag manager and asset tag device are described in more detail below with respect to FIG. 1B.

By way of introduction, the embodiments described herein use an asset tag device. An asset may be coupled with the asset tag device. The asset tag device may scan and receive a broadcast. A beacon device may transmit the broadcast. A beacon device may be associated with a fixed location or a relative location. An asset tag device may also detect signals from other asset tag devices like itself to determine locations without the use of a beacon device. An asset tag may filter and parse received wireless broadcasts to obtain a beacon identifier. The asset tag may transmit the beacon identifier and an asset tag identifier to a hub. Although various embodiments herein describe the functionality of an asset tag device 105A, the functionality may also be achieved by the asset tag manager 105B in connection with a host device 104. Thus, as used herein, "asset tag device 105A" may also include "asset tag manager 105B" unless specified otherwise.

It should be noted that examples provided of an asset management system being used in hospital environments are provided for purposes of illustration, rather than limitation. It should be appreciated that the asset management system, as well as other cooperating devices, may be used in different environments such as disaster relief operations, retail stores, product warehouses, or the like.

FIG. 1B illustrates an asset management system 100, according to one embodiment. The asset management system 100 may be at least partially deployed in area 110. Area 110 can include beacon device 102 and beacon device 103. In one example, the beacon devices 102 and 103 can be fixed to opposite corners of the room. Beacon devices 102 and 103 may transmit wireless broadcast 122 and 123, respectively, using a wireless communication protocol compatible with asset tag device 105A. The asset tag device 105A may be coupled to asset 104. Asset 104 may be any asset as described herein. For example, the asset tag device 105A may be integrated into the hospital cart or other medical device, military equipment, business resource, or the like. An asset tag device 105A may be coupled to or integrated into an asset 104 in a variety of ways. For example, an asset tag device 105A may be a discrete hardware device that is physically fixed to a hard asset. An asset tag device 105A may be a hardware device that is integrated into the hardware of an asset. A third party device, such as a mobile phone, may be converted into an asset tag device 105A by loading the asset tag software (e.g., asset tag manager 105B) and leveraging the hardware of the third party device to perform the functions of the asset tag. Asset tag may refer to asset tag device 105A and/or asset tag manager 105B. The asset tag device 105A includes an asset tag manager 105B, that is, the processing device of the asset tag device 105A executes instructions corresponding to the asset tag manger 105B to perform the functionality describe herein. In other embodiments, the asset tag manager 105B executes on a processing device of a host device, such as the AIO, or other medical asset. In some embodiments, asset tag manager 105B may be a software implementation of asset tag device 105A used to perform one or more functions of the asset tag device 105A. Asset tag manager 105B may be executed by a processing device (not shown).

An asset tag device, such as asset tag device 105A, may be an electronic device coupled to an asset, such as asset 104, and used as part of an asset-tracking system (ATS), such as a real-time locating system (RTLS). In one example, the asset tag device 105A may be a small (e.g., size of a U.S. quarter), resource-constrained (i.e., low processing power, limited memory, and/or limited battery life) device used to transmit data, such as a beacon identifier, to a more powerful central device. The central device, such as a server computer system (also referred to as server 108), may make a determination of a location of asset tag device 105A and/or asset 104 in view of the transmitted data. In another example, the asset tag device 105A may be a wireless device and transmit data using a wireless communication protocol. In another example, the asset tag device 105A may be a low-power consuming device and/or be battery powered. In another example, the asset tag device 105A may use a rechargeable battery, such as a lithium-ion rechargeable battery. In another example, the asset tag device 105A may be coupled to or integrated into asset 104 in a variety of ways. For example, asset tag device 105A may be a discrete hardware device that is physically fixed to a hard asset. In another example, the asset tag device 105A may be a hardware device that is integrated into the hardware of asset 104. A third party device, such as a mobile phone, may be converted into an asset tag device 105A by loading the asset tag software (e.g., asset tag manager 105B) and leveraging the hardware of the third party device to perform the functions of the asset tag device 105A.

Area 110 may refer a physical space delineated by the signal coverage of one or more beacon devices. It should be appreciated that an area 110 may be defined by software and correspond to the physical location of the beacon device and associated wireless broadcast. For example, a large room may have multiple areas. Two beacon devices 102 and 103 located at one side of a room may define an area, while two other beacon devices at the other side of a room may define another area. Software may correlate the location of the beacon devices 102 and 103 and signal coverage of the beacon devices 102 and 103 to define an area, such as area 110. Using two or more beacon devices to define an area may allow an asset management system to improve an accuracy of location determinations of assets. It also should be appreciated that while two beacon devices (i.e., beacon device 102 and 103) are illustrated in FIG. 1B as defining area 110, the number of beacon devices is for purposes of illustration, rather than limitation. An area may be defined by one or more beacon devices and may depend on a variety of factors such as available resources or system requirements.

A beacon device (also referred to as a location identification beacon device), such as beacon device 102 and/or beacon device 103, may be an electronic device fixed to a known location (and/or marking a fixed location) and used to transmit data in for example, a data packet. The data may include a fixed parameter, such as a beacon identifier, which may be used to determine a relative location of a device, the device having received the beacon device's data packet, to the beacon device 102 and/or 103. For example, two different beacon devices (e.g., beacon devices 102 and 103) may be fixed to different corners of a room (e.g., area 101), each transmitting a wireless broadcast (e.g., wireless broadcast 122 from beacon device 102 and wireless broadcast 123 from beacon device 103). Each of the wireless broadcasts may contain a different beacon identifier representative of the different beacon devices. A beacon 102 or 103 can broadcast the wireless broadcast on a periodic basis. The wireless broadcasts 122 and 123 may be received by an asset tag device 105A. The asset tag device 105A may send the beacon identifiers and the asset tag identifier to a server 108 through hub 106. The server 108 may use the beacon identifiers to identify each beacon device, identify the known location of each beacon device, and determine the relative location of the asset tag to the beacon devices. In another embodiment, beacon device 102 and/or 103 may be a small, resource-constrained (i.e., low processing power, limited memory, and/or limited battery life) device used to transmit data, such as a beacon identifier, to asset tag device 105A. Beacon device 102 and/or 103 may be a wireless device transmitting data packets using a wireless communication protocol compatible with asset tag device 105A. The beacon device 102 and/or 103 may be a low-power device and/or battery powered. The beacon identifier may be a unique value, such as a number, assigned to the beacon device by a developer and/or used to identify a beacon device. In one embodiment the major identifier (2 bytes) and/or minor identifier (2 bytes) may be used as a beacon identifier. A signal from a beacon device can include a major number or ID and/or a minor number or ID. In one example, the major ID is used to group a related set of beacon devices. The major number can be 2 bytes, such as 0x0049 or 73. In another example, signals from the beacon device can include the same major ID. In one example, the major ID can be associated with a beacon device and a location of the beacon device. In this example, the asset tag device 105A can use the major ID of the beacon device to determine a location of the asset tag device 105A and corresponding asset 104. The minor ID can be used to identify individual signals from a beacon device. The minor ID can be 2 bytes, such as 0xOOOA or 10. In one example, signals communicated by a beacon device can have different minor IDs and the minor IDs can be associated with a beacon device 102 and a location of the beacon device 102. In this example, the asset tag device 105A can use the minor ID of the beacon device to determine a location of the asset tag device 105A.

The beacon identifier may be distinct from the universally unique identifier (UUID). An example of beacon device 102 and/or 103 may be an iBeacon®, or other device, such as an active radio frequency identification device (RFID), a passive RFID, an infrared device, motion sensor, a sonar or sonic device, a near field communication (NFC) device, a PAN device, Bluetooth® device, BLE device, or the like.

A broadcast may refer to the transmission of a signal containing data in a data packet. A wireless broadcast may be a type of broadcast and may refer to the transmission of a signal containing data without an electrical conductor, for example the transmission of a signal through the air. A wireless broadcast may include an advertisement broadcast or a response broadcast. Any device, such as beacon device 102, beacon device 103, and asset tag device 105A may transmit a broadcast. Any device, such as asset 104, asset tag device 105A, asset tag manager 105B, and/or server 108 may scan and receive a broadcast, such as an advertisement broadcast or a response broadcast. In an advertising mode, a device (e.g., beacon device 102 and/or 103, asset tag 105A or 105B) may transmit (e.g., advertise) an advertisement broadcast including an advertisement data packet without receiving a request from another device (e.g., asset tag 105A, hub 106, or server 108) to transmit the advertisement data packet. The advertisement data packet is a data packet transmitted without receiving a request, from another device, for the data packet. In a response mode, a device (e.g., beacon device 102, beacon device 103, asset tag 105A or 105B) may transmit a response broadcast including a response data packet in response to receiving a request from another device to transmit the response data packet. A response data packet is a data packet transmitted in response to a request, from another device, to transmit the response data packet.

A data packet may refer to a formatted unit of data containing in the form of one or more identifiers. For example, (i.e., data the network uses to deliver the user data) the sequencing information, the length of the payload, source and destination addresses, etc., may each be considered identifiers. In another example, the user data of the data packet may include one or more identifiers. The user data may include company identifiers, source device identifiers, approved device identifiers, signal strength identifiers (e.g., received signal strength indicator (RSSI), property identifiers, parameter identifiers, parameter value identifiers, identifiers of other manufacturing specific data (e.g., manufacturer identifier), wireless broadcast identifiers (e.g., advertisement indicator identifier), location identifiers, beacon identifiers (e.g., a major identifier (ID) and/or minor identifiers (ID)), battery identifiers, etc. Examples of identifiers are provided for purposes of illustration, rather than limitation. It should be appreciated that different identifiers may be available. It should be appreciated that some or all of identifiers in a data packet may be prescribed by the particular communication protocol used to transmit the data packet. A communication protocol used to transmit the data packet may include active or passive RFID, infrared, NFC PAN, Bluetooth®, BLE, Wi-Fi, ZigBee, ultra-wideband (UWB) or the like.

In one embodiment, an asset tag device 105A can scan for wireless broadcast signals (e.g. wireless broadcasts 122 or 123) from beacon devices 102 and 103 located at fixed locations. The wireless broadcast 122 or 123 may include data, such as identifiers, in a data packet. The asset tag device 105A may have limited memory resources to store wireless broadcasts. The asset tag device 105A may filter out signals received from beacons in other locations, e.g., filter out the signal leakage from other beacons not near the asset tag device 105A, or signals received from unapproved devices. The filtering may be based on signal strength or an identifier indicating an unapproved device. If the asset tag device 105A is nearer a first beacon device 102, the wireless broadcast from the first beacon 102 may be detected as the stronger signal. The asset tag device 105A may record the detected signal strength. Similarly, the asset tag device 105A may detect an information signal from the second beacon device 103 and record the signal strength of the second beacon device 103. The asset tag device 105A may then sort the information from the beacons 102 and 103 by strength. In one embodiment, the asset tag device 105A can determine the location of the asset tag device 105A and an associated asset 104 by selecting the signal from the beacon device with the highest signal strength. The asset tag device 105A may parse the sorted information to identify one or more beacon devices that sent the wireless broadcasts. In one example, the asset tag device 105A may broadcast a wireless broadcast 125 to a hub 106. The wireless broadcast 125 may be in a wireless communication protocol. Asset 104 may also broadcast wireless broadcast 124 to hub 106 in the same or different wireless communication protocol. The beacon devices 102 and/or 103 (or any other device) may broadcast data to hub 106. The asset tag device 105A may generate the wireless broadcast or response data packet. The data packet may include one or more parsed beacon identifiers, a signal strength, a, an asset identifier, an asset tag device identifier, a beacon status, an asset tag device status, an asset status, a time stamp, or other components. Other embodiments may include fewer or more pieces of information in the data packet from the asset tag device 105A. The hub 106 may transmit data from the data packet to a server (e.g. the server 108) to determine the real-time location of the asset 104.

It should be noted that a wireless communication protocol conforming to the Bluetooth Low Energy® (BLE) (also referred to as Bluetooth Smart®) standard is used for purposes of illustration, rather than limitation. It should be appreciated that other wireless communication protocols may be used, such as protocols conforming to the Bluetooth® wireless standard (also referred to as Classic Bluetooth®), ZigBee® wireless standard, Wi-Fi® wireless standard, ultra-wideband (UWB) wireless standard, or other current or future standard. It should be noted that Bluetooth® shall refer to at least Bluetooth® Low Energy and Classic Bluetooth®, unless otherwise noted. It should also be noted that in one embodiment, the wireless communication protocol may a short range wireless communication protocol compatible with short range wireless communications (e.g., approximately 100 m or less) in a short range wireless network.

The asset tag device 105A can scan for wireless broadcast signals (e.g. wireless broadcasts 122 or 123) from beacon devices 102 and 103. Scanning may occur periodically. The asset tag device 105A may receive wireless broadcasts from beacons in other locations or from unapproved devices. The asset tag device 105A may filter one or more received wireless broadcasts to generate a subset of wireless broadcasts. The asset tag device 105A may filter based on signal strength of the one or more received wireless broadcasts (e.g. received signal strength indication (RSSI)). In one embodiment, the subset of wireless broadcasts may include a number of devices having a highest RSSI. For example, the RSSI threshold may specify a fixed number of wireless broadcasts (e.g., 10 broadcasts). The fixed number may be based on the memory of the asset device tag 105A. The asset device tag 105A may store the wireless broadcasts in memory. The fixed number may include the wireless broadcasts having the highest RSSI (e.g., top 10 devices based on RSSI).

The asset tag device 105A may identify within the subset of wireless broadcasts, at least one wireless broadcast in view of an indication that a beacon device that transmitted the wireless broadcast is within a predetermined distance from the asset tag device 105A. In one embodiment, the asset tag device 105A may use the RSSI to determine a location of the asset 104 within the room, such as within X distance from the beacon device 102. The asset tag device 105A may receive multiple location IDs from the multiple beacon devices 102 or 103 and use the RSSI of the different location IDs to determine the location of the asset 104. For example, the asset tag device 105A may use the RSSI of the different location IDs to triangulate the location of the asset 104 in the room. In another example, the beacon device 102 may be located at different locations. For example, the beacon device 102 may be located in a hallway, in a lobby, in a stairwell, in a room, in a parking lot, and so forth. When the asset tag device 105A determines its location, the asset tag device 105A may communicate asset information (such as location information, asset management information, and so forth) to a closest hub 106. The asset tag device 105A may identify the beacon devices closest to the asset 104 by selecting the wireless broadcast from the beacon device with the highest RSSI and a second wireless broadcast from a beacon device with a next highest RSSI.

An asset tag device 105A may parse received wireless broadcasts to obtain a beacon identifier. Parsing may occur during scanning or filtering or after scanning.

In one embodiment, the asset tag device 105A may create a data packet including a beacon identifier and an asset tag identifier associated with the asset 104. The beacon identifier may include a beacon identifier for the beacon device 102 or the beacon device 103. The asset tag device 105A may broadcast the created data packet through the wireless broadcast 125 to hub 106. In another example, the asset tag device 105A may broadcast a wireless broadcast to repeater 114, which in turn broadcasts the wireless broadcast 126 to hub 106. The wireless broadcast 125 may be in a wireless communication protocol, such as Bluetooth®. Asset 104 may also broadcast wireless broadcast 124 to hub 106 in the same or different wireless communication protocol. The beacon devices 102 and/or 103 (or any other device) may broadcast data to hub 106. The hub 106 may receive the wireless broadcast from the asset tag device 105A. The hub 106 may transmit information to the server 108. Hub 106 may aggregate data received, format the data, and communicate the formatted data to server 108. The server 108 may determine a location of asset tag device 105A and/or asset 104 or other information in view of the data packet from the asset tag device. The server can analyze the appended information to determine the location of the asset using the beacon identifier, and the asset information. For example, the server can access a database that defines the locations of different beacon devices with different beacon identifiers. The server can compare the received beacon identifier from the asset tag device with the bacon identifier in the database to find a matching pair of beacon identifiers and associate the defined location of the beacon identifier with the asset.

The beacon device 102 or 103 may transmit a wireless broadcast using an advertisement broadcast. The wireless broadcast may include a continuous broadcast. An advantage of broadcasting on a continuous basis can be to provide the location information to an asset tag device 105A upon the device entering an associated radius (e.g., reducing or eliminating lag time for the asset tag device 105A to determine the location of the device). In another example, the beacon device 102 can broadcast the on a periodic basis. An advantage of broadcasting on a periodic basis can be to reduce power consumption of the beacon device 102 by communicating the location information less frequently. The beacon device 102 or 103 may transmit a wireless broadcast using a response broadcast.

Beacon device 102 and 103 have been described in connection with beacon devices using iBeacon technology for purposes of illustration, rather than limitation. Beacon device 102 and/or 103 may include another device, such as an active radio frequency identification device (RFID), a passive RFID, an infrared device, motion sensor, a sonar or sonic device, a near field communication (NFC) device, a PAN device, Bluetooth® device, BLE device, or the like.

In one example, the asset tag device 105A can be coupled to an individual, such as medical personnel in a hospital. For example, the asset tag device 105A can be attached to or integrated into a wristband or watch that can be worn by the individual (such as a medical personnel or patient) and can communicate location information and other information relating to the personnel. A third party device, such as a mobile phone, may be converted into an asset tag device 105A by loading the asset tag software (e.g., asset tag manager 105B) and leveraging the hardware of the third party device to perform the functions of the asset tag device 105A.

An asset tag device 105A may broadcast using an advertisement broadcast or a response broadcast. The asset tag device 105A may broadcast in response to creating a data packet. In one embodiment, the asset tag device 105A may broadcast in response to receiving a request for information from the hub 106.

Hub 106 (also referred to as a communication hub) may refer to an electronic device that connects communication data from one electronic device to another electronic. Hub 106 may include functionality of a conventional network hub, as well as additional functionality. For example, hub 106 may receive, filter, analyze, modify, and/or transmit data to and from multiple devices using wireless and/or wired communication and/or a combination thereof. Hub 106 may transmit received data to multiple ports, similar to a conventional network hub. Hub 106 may perform functions of a network switch and may receive, process, and forward data only to a destination device that needs to receive it (rather than broadcasting the data to each of its ports). Hub 106 may also function as a wireless access point (AP) and allow wireless devices to connect using a wireless communication protocol (e.g., Wi-Fi®). Hub 106 may provide a hotspot, a physical location offering internet access, over a wireless local area network (WLAN) through the use of another device such as a router to connect to an internet service provider. Additionally, hub 106 may perform access control (e.g., authentication) to control which devices have access to the network. Hub 106 may also function as a router to forward data packets between multiple computer networks. Hub 106 may perform software defined networking (SDN) functions. For example, hub 106 may function similar to a Dynamic Host Configuration Protocol (DHCP) server that may assign an internet protocol (IP) address to a device (e.g., authenticated device), attempting to use a network, such as a Wi-Fi® network associated with hub 106. An internet protocol (IP) table may be configured to route data from devices within a range of IP addresses to one location and/or through a particular channel and route data from devices within another range of IP addressed to another location and/or through another channel. Although not illustrated in FIG. 1B, hub 106 may transmit data to computer systems in a local area network (LAN). For example, hub 106 may transmit data to the internal hospital data center. Hub module 112 may be a software implementation of hub 106 and perform some or all the functions of hub 106.

In one embodiment, hub 106 may have one or more communication channels. Hub 106 may include corresponding hardware and/or software for each communication channel. For example, hub 106 may include several wireless communication channels conforming to a wireless communication protocol of a low energy PAN standard, such as a Bluetooth® channel (i.e., a channel compliant with the Bluetooth® standard able to transmit and/or receive signals), several wireless communication channels conforming to a wireless communication protocol of a WLAN standard, such as a Wi-Fi® protocol and/or wireless communication channels conforming to a different wireless communication protocol, such as a cellular channel (i.e., a channel compliant with a cellular standard able to transmit and/or receive cellular signals). Hub 106 may also include wired channels, such as an Ethernet channel. Hub 106 may have an interface for each channel capable of transmitting and/or receiving in the communication protocol associated with the channel. For example, hub 106 may include one or more separate antennas for each channel and/or one or more integrated antennas. Hub 106 may include one or more antennas to receive a wireless communication protocol of a low energy wireless PAN standard, such as an antenna capable to receive Bluetooth® signals, one or more antennas to receive a wireless communication protocol of a WLAN standard, such as an antenna to receive Wi-Fi® signals, a wired Ethernet port, and/or a cellular antenna (e.g., multiple-input and multiple-output (MIMO) antenna). A channel may be implemented by a hardware dongle compatible with the particular standard (e.g., a Bluetooth® dongle).

In one embodiment, hub 106 may receive data from multiple source devices such as asset 104, asset tag device 105A, repeater 114, beacon device 102 and 103, or other devices such as third-party mobile devices. A source device may refer to an electronic device at which the received data (e.g., communication data) originated or was created. For example, an asset tag device 105A may send a wireless broadcast to repeater 114, which in turn transmits the wireless broadcast to hub 106. In this example, the asset tag device 105A may be considered a source device because data in the wireless broadcast originated from the asset tag device 105A. In another embodiment, a source device may be the electronic device from which the data was received (e.g., repeater 114 in the previous example). Hub 106 may further filter and transform the data, and transmit the modified data through a cellular network and/or wired network (e.g., local area network (LAN)). A cellular network (e.g., mobile network) may be a wireless network distributed over areas (e.g., cells), each served by at least one fixed-location transceiver (e.g., cell site or base station). Each cell may use a different set of frequencies from neighboring cells to avoid interference and provide bandwidth within each cell. The cellular network may use any mobile telecommunications technology such as third generation (e.g., 3GPP LTE), fourth generation (e.g., WiMAX, 4G LTE), and fifth generation (5G) of mobile telecommunications technology. A cellular communication protocol may be a long range wireless communication protocol used for long range wireless communications in a long-range cellular network. In one example, hub 106 may receive data in data packets conforming to a wireless communication protocol of a low energy PAN standard (e.g., BLE® protocol) and/or a wireless communication protocol of a WLAN standard (e.g., Wi-Fi® data format protocol) and re-transmit data to the server 108 using cellular communication protocols on a cellular network. In another example, hub 106 may receive data in data packets conforming to the PAN standard and/or WLAN standard and re-transmit data to another local server (not shown) using a wired Ethernet cable (e.g., in a LAN).

In one embodiment, hub 106 may be located at a selected location within a facility, such as on each floor of a hospital environment (e.g., facility). Hub 106 may be located at select locations in the hospital environment so as to provide communication coverage throughout the environment. In one example, hub 106 may be located in high traffic areas or along routes or paths that the asset 104 may frequently move along. In another example, the locations can be predefined locations selected during the construction of an environment. In another example, the locations can be selected to provide a desired coverage area, such as a wing of a hospital environment.

In one embodiment, hub 106 may provide a secure private network for devices (such as server 108, asset tag device 105A, or asset 104) to communicate with the hub 106. For example, hub 106 may provide a secure wireless area network (WLAN), secure PAN, or Private Wide Area Network (PWAN) to communicate with a device, such as an asset tag device 105A and/or asset 104. In another example, hub 106 may be a gateway or access point for the asset 104 and/or asset tag device 105A to access information stored on the server 108. For example, hub 106 maybe a network switch enabling asset 104 to access a secure server, such as electronic medical records (EMRs), hospital information system (HIS) information, or an active directory of a hospital server. The devices in the WLAN may use the Wi-Fi® technology and IEEE 802.11 standards defined by the Wi-Fi Alliance. Alternatively, the devices in the WLAN may use other technologies and standards. Similarly, the devices in the PAN or WPAN may use the Bluetooth® technology and IEEE 802.15 standards defined by the Bluetooth Special Interest Group. Alternatively, the devices in the secure PAN may use other technologies and standards. The WAN or PWAN can be used to transmit data over long distances and between different LANs, WLANs, metropolitan area networks (MANs), or other localized computer networking architectures.

In some embodiments, the hub 106 can be configured to receive information via a BLE® communication channel and/or a Wi-Fi® communication channel from a repeater 114 and communicate the information to a server 108 via a cellular communication channel or to a cloud-based service. In one example, the hub 106 can include a multiband antenna to communicate on the different communication channels. In another example, the hub 106 can include multiple antennas configured for communication on different communication channels.

In one embodiment, hub 106 may prepare data for transmission to another device, such as server 108. For example, hub 106 may reformat the data that is received into another format. The format may refer to the organization of data (e.g., a data format) according to a predefined specification. The hub 106 may prepare the data by compressing data in a compression format, securing data in a secure format (e.g., encryption format), changing the data for example, to be compliant with a communication protocol (e.g., Wi-Fi® to Bluetooth®, Bluetooth® v. 1.0 to Bluetooth® v. 2.0), removing data, and/or adding data.

In another embodiment, hub 106 may include a network compliance device configured to run a Health Level 7 (HL7) engine. HL7 may refer to a set of international standards for transfer of clinical and administrative data between software applications used by various healthcare providers. HL7 may provide a framework for the exchange, integration, sharing and retrieval of data used by healthcare providers. The HL7 engine may format information to an HL7 electronic medical record (EMR) standard. HL7 may provide a framework for the exchange, integration, sharing and retrieval of electronic health information. Hub 106 may use a HL7 formatting engine to aggregate data received, format the data to an HL7 standard, and communicate the formatted data to server 108.

Asset management system 100 may also include repeaters, such as repeater 114. A repeater, such as repeater 114, may refer to an electronic device that receives a signal and retransmits the signal, often at a higher power. A repeater 114 may receive data from asset tag device 105A and relay the data to hub 106 or another repeater (not shown). A repeater 114 may also act as a bridge to receive data formatted in one wireless communication protocol (e.g., BLE®) and re-transmit in another wireless communication protocol (e.g., Wi-Fi®). The repeater may be used by a device to tether (e.g., using Bluetooth® and/or Wi-Fi®) to the Internet. Repeater 114 may be configured as a network of repeaters, such as nodes in a piconet. A piconet may be a wireless personal area network (WPAN) formed by a device (e.g., Bluetooth® compatible device) serving as a master in the piconet and one or more other devices (e.g., other Bluetooth® compatible devices) serving as slaves. In one example, a hospital may have multiple repeaters located at different locations in the hospital. The repeaters, such as repeater 114, may receive data from asset tag device 105A, asset 104, beacon device 102, and/or beacon device 103 and relay the data to hub 106. Repeater 114 may relay the data directly to the hub 106 or indirectly relay the data to hub 106 via one or more other repeaters. In one embodiment, each floor or department of a hospital environment may include a hub, such as hub 106 to receive information from one or more repeaters that provide wireless coverage of the floor. Repeater 114 may be powered by a batter, powered by an electrical outlet, or powered by any other manner. Repeater 114 may be a small form factor device, such as the size of human child's fist.

Server 108 (also referred to as a server computer system) may be a computing device such as server computer, a desktop computer, or a laptop computer, or a portable computing device such as, but not limited to, mobile telephones, personal digital assistants (PDAs), portable media players, netbooks, tablet computers, portable gaming consoles, portable televisions, electronic book readers, and the like. Although a single server (e.g., server 108) is illustrated in FIG. 1B, any number of servers may be present in an AMS.

Server 108 may be a server computer system that is part of an online infrastructure system. Examples of an online infrastructure include a cloud computing platform that may allow multiple users from multiple client systems to access different components or computer resources of the cloud computing platform. The online infrastructure may provide physical and/or virtual resources, such as access to services, servers, or other such resources, to client systems. Examples of services (or functionality) provided by the online infrastructure may include, but are not limited to, access to data stored on storage devices, provisioning of virtual machines, software services, physical servers, etc.

Server 108 may store, process, and or analyze data received from hub 106, as well as beacon device 102 and 103, asset 104, and asset tag device 105A. In one embodiment, the server 108 may use the beacon identifiers and asset tag identifiers to determine the real-time location of an asset (e.g., real-time location system (RTLS)).

In one embodiment, server 108 may determine the location of asset 104 from the beacon identifier of beacon device 102 and/or beacon device 103, and the asset tag identifier. The server 108 may also record a time stamp indicating when the beacon identifiers were received by asset tag device 105A. Server 108 may store data associating the location of a beacon device in an environment to a specific beacon identifier. Additionally, sever 108 may store additional data mapping an asset tag identifier to an asset. Accordingly, the beacon identifier and asset tag identifier may be correlated, using the mapping data, to a location in an environment. The location may be the area 110 and/or include a location within area 110 where the asset tag device 105A and associated asset 104 are located (e.g., the middle of area 110).

In one embodiment, the server 108 may include an application programming interface (API), such as a representational state transfer (REST) application program interface (API) interface, to enable applications to retrieve and present data, such as asset data and/or management data, to users. For example, an application may include a user interface with a map of a facility. The application may access the asset data and/or management data and determine the locations of one or more assets in the facility. The application may display the locations of the asset to a user. In another example, the application may query or search the asset data and/or management data to determine user requested data, such as location information of an asset, usage information of an asset, and so forth.

In another embodiment, server 108 may receive battery data indicating battery usage information and/or battery life information for an asset 104, asset tag device 105A, and/or beacon devices 102 and 103. Server 108 may use the battery data to determine a trend in the amount of time a battery of the device may be used, an estimated remaining battery life, battery errors, when to replace a battery, and so forth. For example, asset tag device 105A may receive a battery identifier in a wireless broadcast from beacon device 102 and 103. When creating a data packet, asset tag may include the battery identifier of each beacon device and/or a battery identifier for asset tag device 105A. The battery data, including the battery identifiers may be transmitted to hub 106. A battery identifier may include information such as remaining battery life, battery consumption, and/or battery usage rate of an associated device.

In another embodiment, data such as software updates or patches may be communicated from the server 108 to a hub 106, asset 104, asset tag device 105A, and/or beacon devices 102 and 103.

Figure 1C:
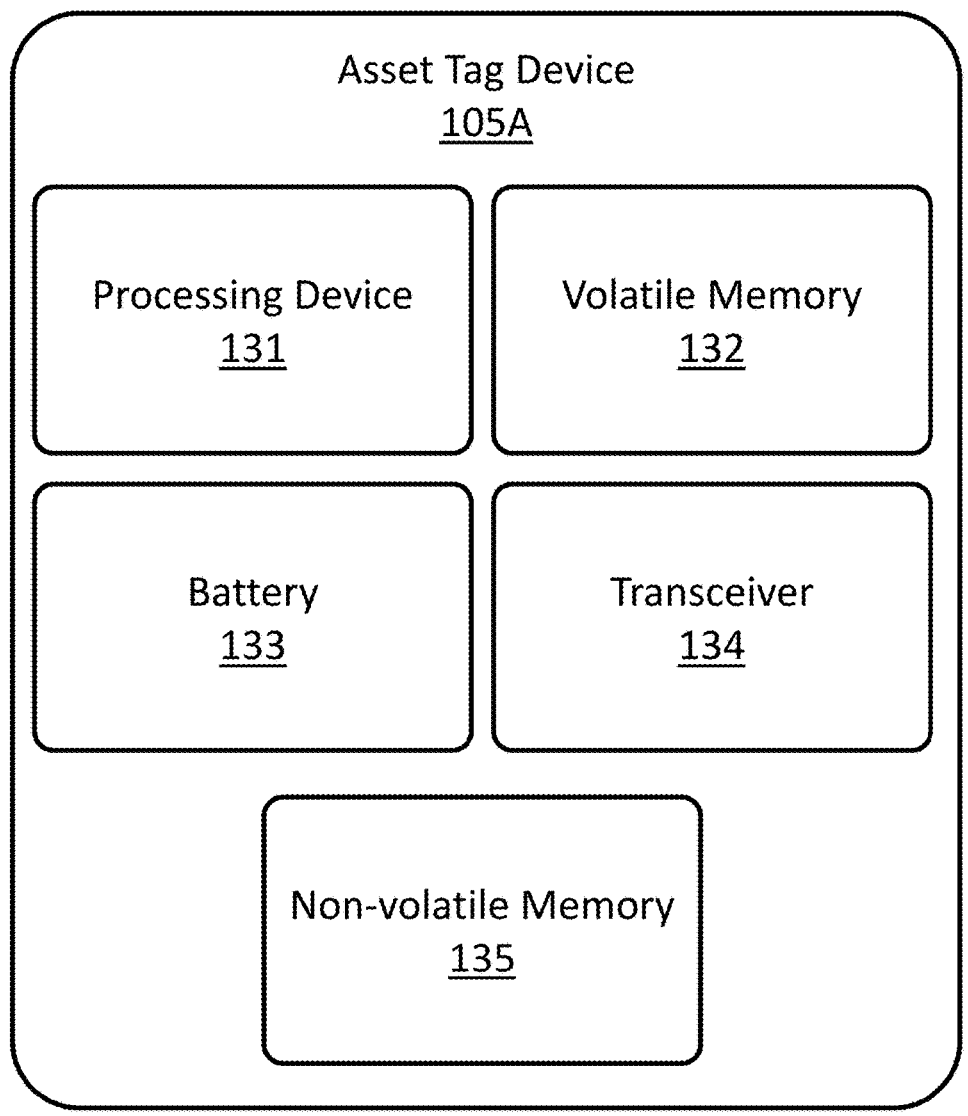
FIG. 1C illustrates an asset tag device, according to one embodiment.

FIG. 1C illustrates an asset tag device 105A. The tag device may be a physical device which includes a physical housing, an electrical power supply such as a battery 133, a circuit board or other control system with a memory (including volatile memory 132 and non-volatile memory 135), a transceiver 134 (including an antenna), and a processing device 131. In one embodiment, the tag 108 can enter the area 110 and detect local broadcast signals. The tag 108 may detect a variety of different signals. For example, the tag 108 may detect signals from the first beacon 104 and the second beacon 106. The tag 108 may also detect signals from other tags like itself. The tag 108 may also detect signals from other devices or electronic equipment. In one embodiment, the tag 108 is capable of differentiating beacon signals from other signals. The tag 108 may ignore or discard information from the other signals.

FIG. 2 illustrates a perspective view of one embodiment of an asset tag device 200. The illustrated example includes a first housing portion 202 and a second housing portion 204. The first housing portion 202 and the second housing portion 204 may be plastic, metal, composite, or another material. The two portions 202 and 204 may be joined by mechanical forces, chemical bonding, thermal coupling, or in another manner. The two housing portions 202 and 204 may have surface features to provide aesthetic or functional characteristics. For example, one or both of the housing portions 202 and 204 may include a company logo or individual tag name or number to identify the source of the asset tag device 200 or the asset tag device 200 itself. The housing portions 202 and 204 may include a surface feature to improve grip or remove sharp edges for safety. The housing portions 202 and 204 may be separable to allow for separation to maintain the asset tag device 200. For example, the housings 202 and 204 or part of the housings 202 and 204 may be removable to allow for a battery change or component replacement. The housings 202 and 204 may also be permanently sealed to prevent tampering, provide intrusion prevention (dust proofing, water proofing, etc.). Other features may be included. In the illustrated example, the asset tag device 200 includes a port 206. The port 206 may facilitate charging or electrically connecting the asset tag device 200 to a power source or processing device. The port 206 may facilitate one or more of a variety of different connections. The port 206 may include a connection to the battery, circuit board or other control system with a memory, transceiver, processor, or the like of the asset tag device 200. The port may facilitate a connector which is proprietary or generic. In the illustrated example, one port 206 is included. In other examples, more than one port 206 may be included.

Asset tag device 200 also includes an attachment point 208. The attachment point 208 facilitates connection of the asset tag device 200 to another structure. The attachment point 208 may be a through-hole to allow for clipping the asset tag device 200 to another structure, inserting a string or other tie or lanyard to manage the asset tag device 200. The attachment point 208 may also be a magnetic point to facilitate magnetically coupling the asset tag device 200 to a magnetic or metallic surface or structure. Examples of the attachment point 208 may include other structures or features of the asset tag device 200 that facilitate connection of the asset tag device 200 to another structure or enable a user to handle or manage the asset tag device 200.

Figure 3:
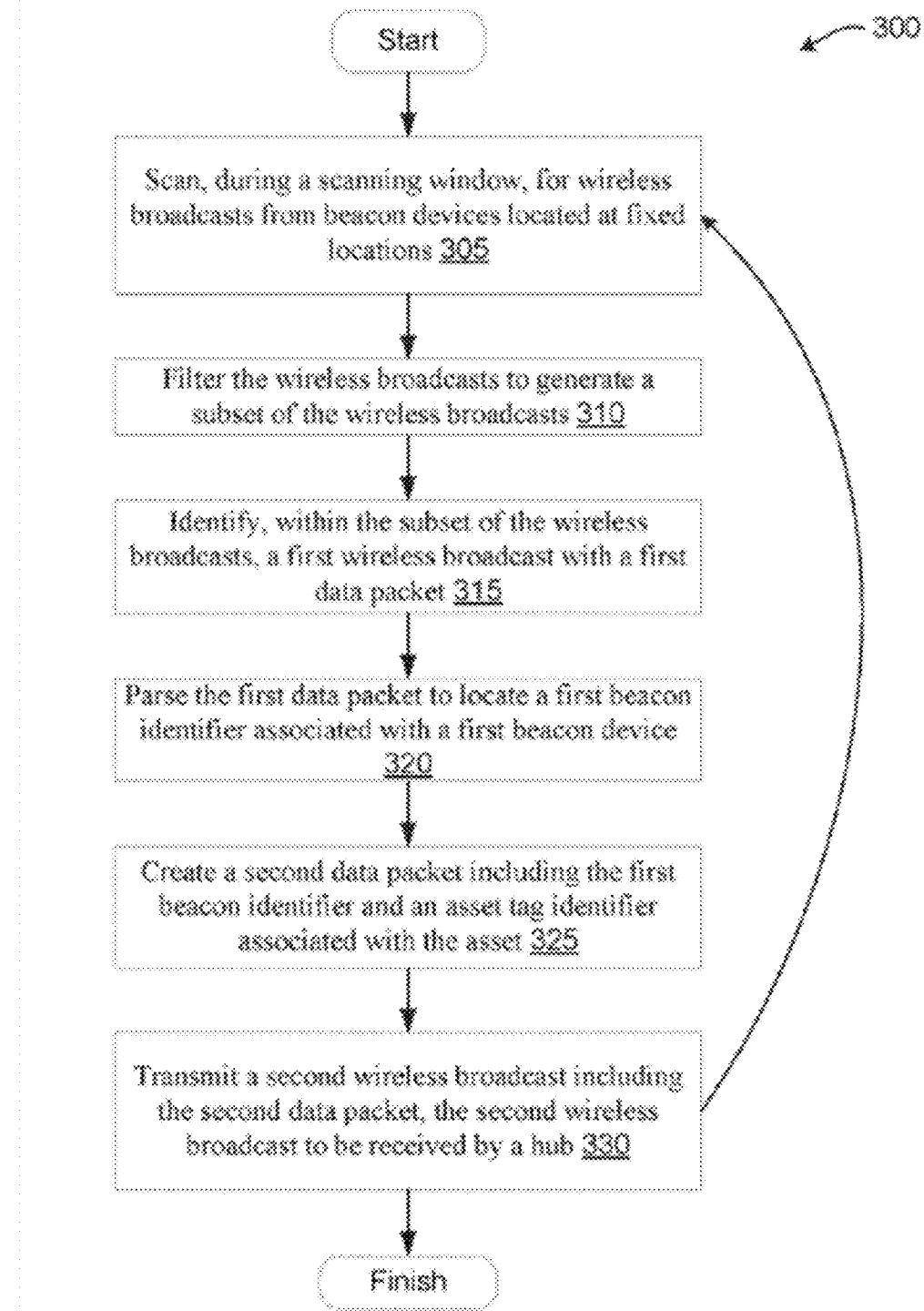
FIG. 3 illustrates a method of scanning for wireless broadcasts by an asset tag, according to one embodiment.

FIG. 3 illustrates a method of scanning for and transmitting wireless broadcasts by an asset tag, according to one embodiment. The method 300 may be performed by processing logic that comprises hardware (e.g., circuitry, dedicated logic, programmable logic, microcode, etc.), software (such as instructions run on a processing device), or a combination thereof. The method 300 may be performed all or in part by asset tag manager 105B.

Method 300 begins at block 305 where processing logic executing the method 300 scans, during a scanning window, for wireless broadcasts from beacon devices located at fixed locations. In one embodiment, the wireless broadcasts include advertisement broadcasts. In another embodiment, the wireless broadcasts include response broadcasts. The asset tag device can be in a scan mode to scan for a wireless broadcast from a beacon device. When the asset tag device locates a beacon device, the asset tag device can communicate with the beacon device to receive beacon information. In one example, the beacon device can broadcast out the beacon information when the asset tag device is with a broadcast range of the beacon device. The asset tag device can receive the beacon information signal. In another example, the asset tag device can communicate with the beacon device to request the beacon information. The asset tag device can receive wireless broadcast signals from multiple beacons devices. A wireless broadcast from a beacon device may include a beacon identifier in a data packet.

The method 300 continues to block 310, where processing logic filters the wireless broadcasts to generate a subset of the wireless broadcasts. Filtering may include the asset tag device sorting received wireless broadcasts based on the signal strength of the broadcast from the beacons. Filtering may be based on signal strength or an identifier indicating an unapproved device. In one embodiment, the subset of wireless broadcasts may include a number of devices having a highest RSSI. For example, the RSSI threshold may specify X number of source devices (e.g., 10 devices) having the highest RSSI (e.g., top 10 devices based on RSSI). Filtering may occur at least in part after the scanning.

Method 300 continues to bock 315 where processing logic identifies within the subset of the wireless broadcasts, a wireless broadcast (e.g. first) with a data packet. The asset tag device may identify the wireless broadcast based on the asset tag device being within a distance from a first beacon device. The first beacon device may transmit the first wireless broadcast. The asset tag device may determine the distance based on a signal strength of the wireless broadcast. The distance may include a relative distance.

Method 300 continues to block 320 where processing logic parses the data packet (e.g. first) associated with a beacon device (e.g. first). The data packet may include a beacon identifier of the beacon device that sent the wireless broadcast containing the data packet. In some embodiments, the asset tag device may parse the data packet to identify a major identifier and a minor identifier. The asset tag device may store the parsed identifiers in local memory. The local memory may be a non-volatile memory. processing logic may parse the communication data for a source device identifier. As noted above, the data packet may include multiple identifiers, such as company identifiers, source device identifiers, identifiers of other manufacturing specific data (e.g., manufacturer identifier), etc. Any identifier or a combination of identifiers may be used as a source device identifier. For example, the company identifier and/or manufacturing identifier may be used as a source device identifier. It should be noted that the source device identifier may include information to determine the source device is not approved, which may or may not be enough information to determine the actual source device.

Method 300 continues to block 325, where processing logic creates a data packet (e.g. second) including the beacon identifier (e.g. first) and an asset tag identifier associated with the asset. The asset tag device may create a data packet which includes the parsed major and minor identifiers. The data packet may also include a signal strength, a beacon identifier, an asset identifier, an asset tag device identifier, a beacon status, an asset tag device status, an asset status, a time stamp, battery or power level information for a beacons device, asset tag device, or asset, or other information. Other embodiments may include fewer or more pieces of information in the data packet. In some embodiments, the asset tag device can append the beacon identifier or the like to the asset information and communicate the appended asset information to the hub.

Method 300 continues to block 330, where processing logic transmit a wireless broadcast comprising the data packet (e.g. second). The wireless broadcast may be received by a hub, repeater, server, or other device. The wireless broadcast may include an advertising broadcast or a response broadcast. After transmitting the wireless broadcast, the asset tag device may return to scanning as described at block 305.

Figure 4:
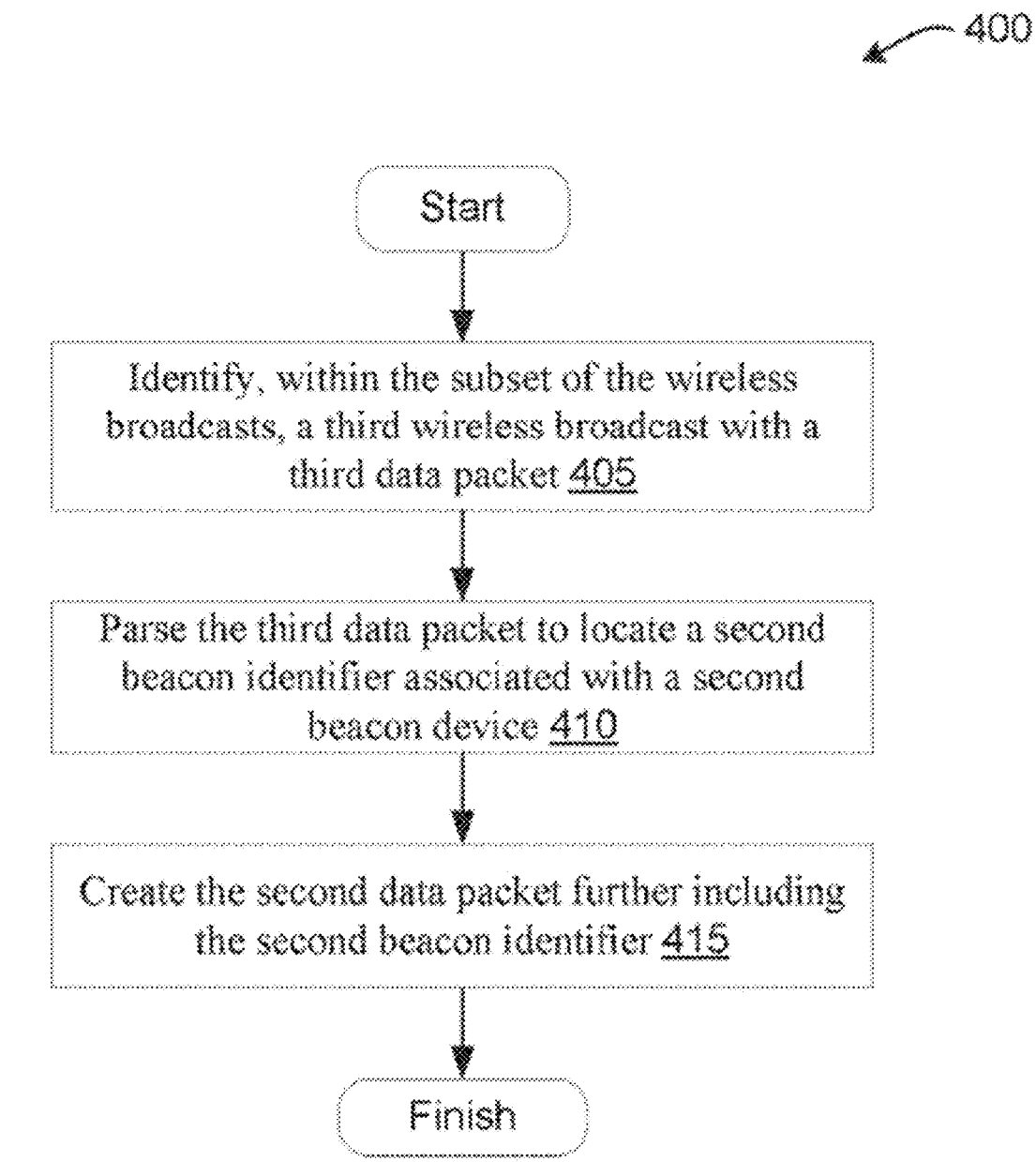
FIG. 4 illustrates a method of scanning for wireless broadcasts by an asset tag, according to another embodiment.

FIG. 4 illustrates a method of scanning for and transmitting wireless broadcasts by an asset tag, according to another embodiment. The method 400 may be performed by processing logic that comprises hardware (e.g., circuitry, dedicated logic, programmable logic, microcode, etc.), software (such as instructions run on a processing device), or a combination thereof. The method 400 may be performed all or in part by asset tag manager 105B.

Method 400 begins at block 405 where processing logic executing the method identifies, within the subset of the wireless broadcasts, another wireless broadcast (e.g., third) with another data packet (e.g., third). The asset tag device can receive multiple beacon identifiers from the multiple beacon devices and use the RSSI of the different wireless broadcasts to determine the location of the asset tag device. For example, the asset tag device can use the RSSI of the different wireless broadcasts to triangulate the location of the asset tag device and associate asset in a certain room. In another example, the beacons can be located at different locations. For example, the second beacon can be located in a hallway, in a lobby, in a stairwell, in a room, in a parking lot, and so forth. The asset tag device may identify within the subset of wireless broadcasts, at least one wireless broadcast in view of an indication that a beacon device (e.g. second beacon device) that transmitted the wireless broadcast is within a predetermined distance from the asset tag device. The indication may include the signal strength of the wireless broadcast from the beacon device. The identifying of block 405 may be performed as part of block 315 of the method 300. In some embodiments, two or more beacons may define an area.

Method 400 continues to block 410, where processing logic parses the data packet to locate another beacon identifier (e.g., second) associated with another beacon device (e.g., second beacon device). Similar to method 300, in one example, the beacon identifier may include the major identifier and/or minor identifier. The parsing of the block 410 may be similar to the parsing described in block 320 of the method 300.

Method 400 continues to block 415, where processing logic creates the data packet (e.g., second) to further include the beacon identifier of the other beacon device. The data packet may include a separate data packet from the data packet described in block 325 of the method 300. The asset tag device may create a data packet which includes the parsed major and minor identifiers. The data packet may also include a signal strength, a beacon identifier, an asset identifier, an asset tag device identifier, a beacon status, an asset tag device status, an asset status, a time stamp, battery or power level information for a beacons device, asset tag device, or asset, or other information. Other embodiments may include fewer or more pieces of information in the data packet. In some embodiments, the asset tag device can append the beacon identifier or the like to the asset information and communicate the appended asset information to the hub.

Figure 5:
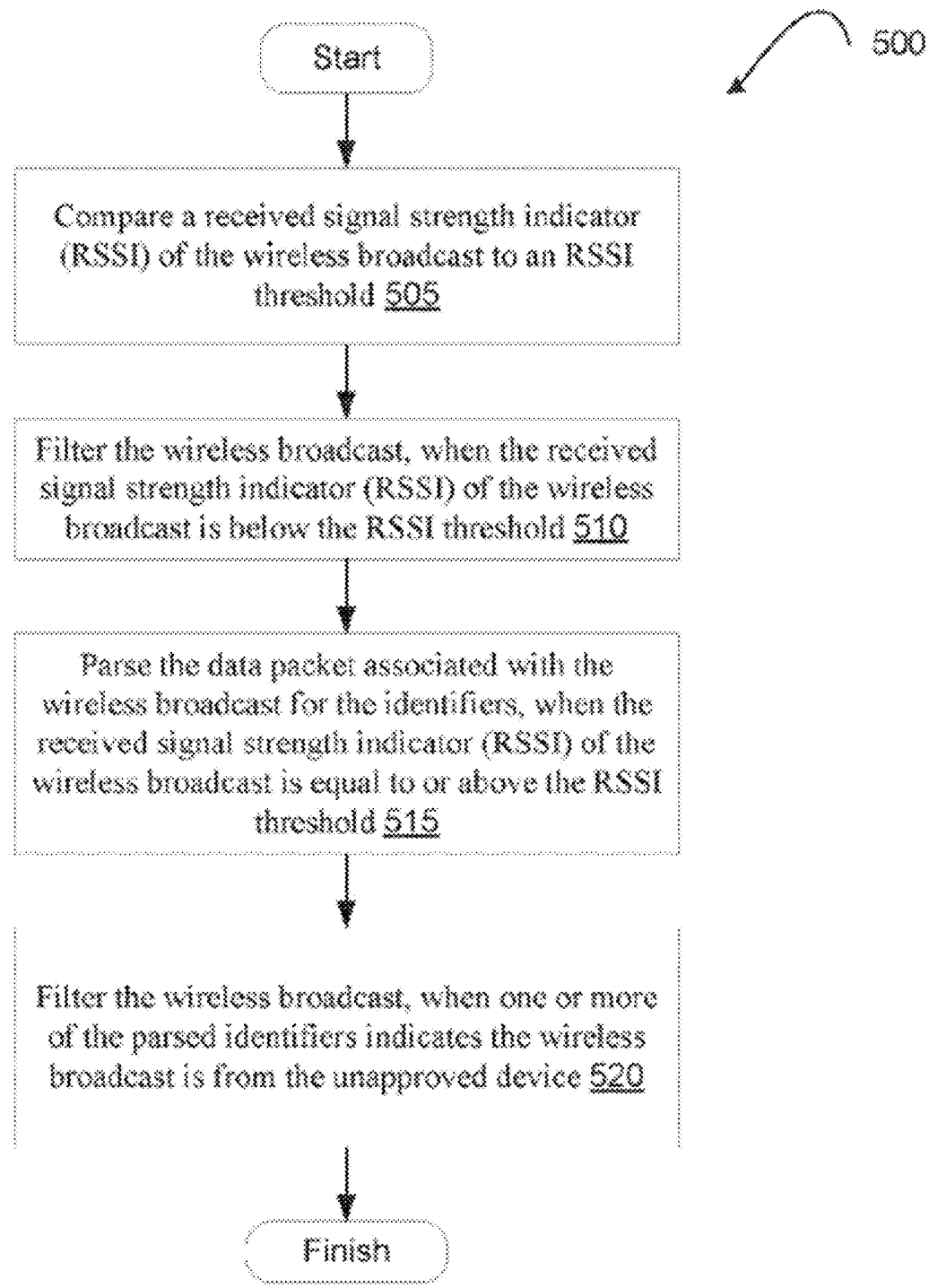
FIG. 5 illustrates a method of filtering wireless broadcasts by an asset tag, according to one embodiment.

FIG. 5 illustrates a method of filtering wireless broadcasts by an asset tag, according to one embodiment. The method 500 may be performed by processing logic that comprises hardware (e.g., circuitry, dedicated logic, programmable logic, microcode, etc.), software (such as instructions run on a processing device), or a combination thereof. The method 500 may be performed all or in part by asset tag manager 105B.

Method 500 begins at block 505, where processing logic executing the method compares a received signal strength indicator (RSSI) of the wireless broadcast to an RSSI threshold. Method 500 continues to block 510, where processing logic filters the wireless broadcast, when the received signal strength indicator (RSSI) of the wireless broadcast is below the RSSI threshold. The RSSI threshold may be a numerical threshold. The RSSI threshold may be set by an administrator and/or developer. For example, the RSSI threshold may be set to −110 dBm, or any other value. The RSSI threshold may also include a number of devices having a highest RSSI. For example, the RSSI threshold may specify X number of source devices (e.g., 10 devices) having the highest RSSI (e.g., top 10 devices based on RSSI). The RSSI threshold may also include a number of devices having a highest RSSI and exceed a numerical RSSI threshold (e.g., the top 10 devices based on RSSI and exceeding the RSSI value of −110 dBm). In one example, received wireless broadcasts with RSSI below the RSSI threshold may be from source devices from outside an area of interest.

Method 500 continues to block 515, where processing logic parses the data packet associated with the wireless broadcast for the identifiers, when the received signal strength indicator (RSSI) of the wireless broadcast is equal to or above the RSSI threshold. For example, if the RSSI threshold is set to −110 dBm, all source devices with an RSSI exceeding or equal to −110 dBm are parsed, while all source devices with an RSSI below −110 dBm are not parsed. In another example, processing logic determines all source devices with RSSI below −110 dBm are parsed, but determines only the top 10 source devices with the highest RSSI and have an RSSI above or equal to −110 dBm are parsed.

Method 500 continues to block 520, where processing logic filters the wireless broadcast, when one or more of the parsed identifiers indicate the wireless broadcast is (e.g., originated) from the unapproved device. The wireless broadcast may be analyzed (e.g., parsed) to locate identifiers indicating an approved or unapproved device. For example, processing logic may analyze the wireless broadcast to determine a source device identifier by parsing the wireless broadcast to look for a company identifier and/or a manufacturing identifier. When at least one of the company identifier and manufacturing identifier does not match approved identifiers (i.e., approved source device identifiers), processing logic may determine the communication data is from an unapproved device, and not authorized. When both the company identifier and manufacturing identifier match the corresponding approved identifiers, processing logic may determine that the communication data is from an approved source device, and authorized. It should be appreciated than any identifier or combination of identifiers may be used as an indication that a wireless broadcast is from an approved source device.

Figure 6:
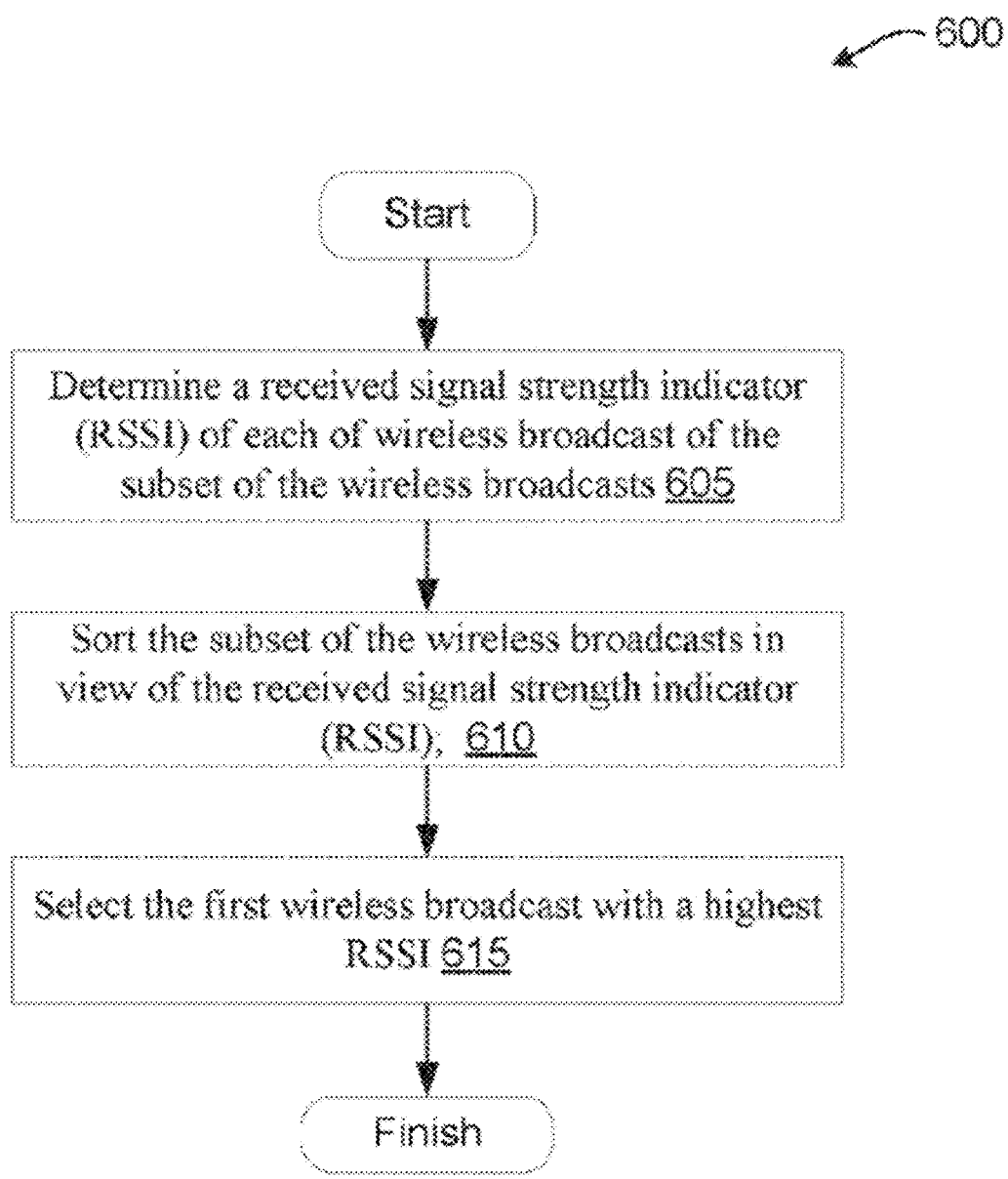
FIG. 6 illustrates a method of identifying a wireless broadcast, according to one embodiment.

FIG. 6 illustrates a method of identifying a wireless broadcast, according to one embodiment. The method 600 may be performed by processing logic that comprises hardware (e.g., circuitry, dedicated logic, programmable logic, microcode, etc.), software (such as instructions run on a processing device), or a combination thereof. The method 600 may be performed all or in part by asset tag manager 105B.

The asset tag device may use the signal strength to determine a distance from a beacon device. The signal strength may include RSSI. In one example, a wireless broadcast from a beacon device can include a transmit power field. The transmit power field can indicate a transmit power of the beacon device when the beacon device communicates a wireless broadcast. In one example, the asset tag device can use the transmit power field to determine a distance between the beacon device and the asset tag device. For example, the tag can determine a signal power of an advertisement received at the asset tag device and compare the signal power with the transmit power field. The asset tag device can determine a distance between the beacon device and the asset tag device by calculating the distance it would take for the transmit power to decrease to the power of the wireless broadcast. In one example, the asset tag device can determine the distance between the beacon device and the asset tag device within a range, such as near the beacon device, far away from the beacon device, or out of range of the beacon device. In another example, the asset tag device can determine the distance between the beacon device and the asset tag device as an actual distance (such as meters or feet). Although, the asset tag device is described as determining the distances, in some embodiments, the distance is determined at a hub or server or other device separate or downstream from the asset tag device and beacon device.

Method 600 begins at block 605, where processing logic executing the method determines the received signal strength indicator (RSSI) of each wireless broadcast of the subset of the wireless broadcast. In one example, analyzing includes parsing the communication data to locate an RSSI. The wireless broadcast may have been wirelessly transmitted by a source device. It should be appreciated that a receiving device, such as an asset tag device, may have the functionality to measure the RSSI of the received wireless broadcasts. It should also be appreciated the RSSI may be included in the wireless broadcast by the receiving device. For example, the wireless broadcast may include an RSSI identifier indicating an RSSI value of the received wireless broadcast. Determining the RSSI may occur, at least in part, during filtering.

Method 600 continues to block 610, where processing logic may sort the subset of the wireless broadcasts in view of a received signal strength indicator (RSSI). Sorting in view of the RSSI may include sorting the wireless broadcasts from the highest RSSI to the lowest RSSI. Method 600 continues to block 615, where processing logic may select the wireless broadcast as the broadcast with the highest RSSI from the sorted wireless broadcasts.

In another embodiment, processing logic may use signal strength to identify the two or more beacon devices closest distance from the asset tag. Processing logic may determine the RSSI of wireless broadcasts for two or more beacon devices. Processing logic may sort the subset of the wireless broadcasts in view of a received signal strength indicator (RSSI). For example, the asset tag device 105A may identify the beacon devices closest to the asset 104 by selecting the wireless broadcast from the beacon device with the highest RSSI and a second wireless broadcast from a beacon device with a next highest RSSI. The asset tag device may differentiate beacon devices using beacon identifiers, major identifiers, minor identifiers, or the like.

Figure 7:
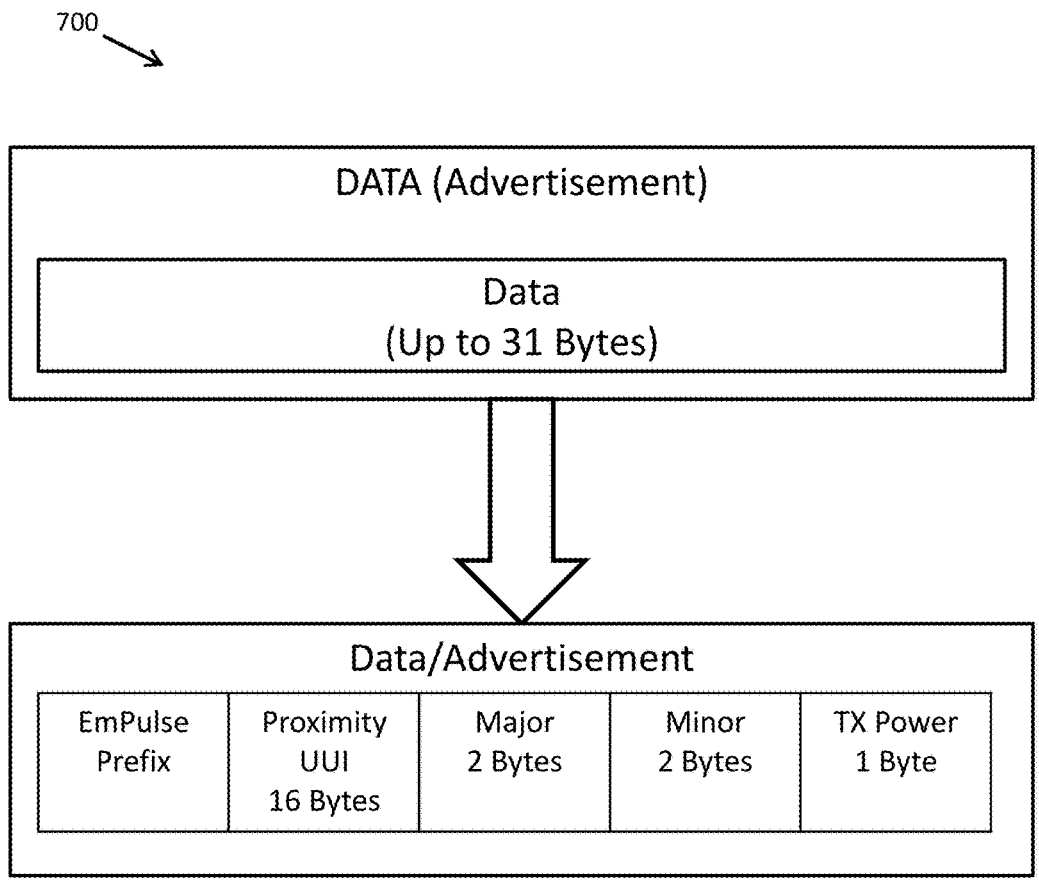
FIG. 7 illustrates a format of a data packet, according to one embodiment.

FIG. 7 illustrates a beacon format packet according to one embodiment. In one example, the beacon format can include a fixed beacon prefix. In another example, the beacon format packet can include a proximity UUID that can be an identifier to distinguish between beacons communicated from the location ID beacons and beacons communicated from other devices. In one example, an asset or device can scan for beacons with a UUID designated for beacons communicated from the location ID beacons. In another example, the asset or device can scan for beacons with manufacturing specific information and/or device names designated for beacons communicated from the location ID beacons.

A beacon from a location ID beacon can include a major number and/or a minor number. In one example, the major number is used to group a related set of beacons. FIG. 7 illustrates that the major number can be 2 bytes, such as 0x0049 or 73. In another example, beacons from the location ID beacon store can include the same major number. In one example, the major number can be associated with a location ID beacon and a location of the location ID beacon. In this example, an application at an asset or an asset tag can use the major number of the beacon to determine a location of the asset or the asset tag. The minor can be used to identify individual beacons from a location ID beacon. FIG.

7 illustrates that the minor number can be 2 bytes, such as OxOOOA or 10. In one example, beacons communicated by a location ID beacon can have different minor numbers and the minor numbers can be associated with a location ID beacon and a location of the location ID beacon. In this example, an application at an asset or an asset tag can use the minor number of the beacon to determine a location of the asset or the asset tag.

A beacon from a location ID beacon can include a transmit power field. The transmit power field can indicate a transmit power of the location ID beacon when the location ID beacon communicates a beacon. In one example, the asset or asset tag can use the transmit power field to determine a distance between the location ID beacon and the asset. For example, the asset can determine a signal power of a beacon received at the asset and compare the signal power with the transmit power field. The asset can determine a distance between the location ID beacon and the asset by calculating the distance it would take for the transmit power to decrease to the power of the signal. In one example, the asset can determine the distance between the location ID beacon and the asset within a range, such as near the location ID beacon, far away from the location ID beacon, or out of range of the location ID beacon. In another example, the asset can determine the distance between the location ID beacon and the asset as an actual distance (such as meters or feet).

FIG. 7 illustrates that the transmit power field can be OxC5=197, where 2's complement=256−197=−59 dBm. The strength of the signal can be measured at 1 meter from the device, e.g., a received signal strength indication (RSSI). The strength of the signal can decrease in a predefined pattern. When the asset determines the RSSI at 1 meter and the current RSSI, the asset can calculate the difference. In another example, the asset can adjust the predefined pattern used to determine distance based on a congestion level of a location where the asset is located. For example, when the asset is located at a location with furniture, people, and/or communication congestion the RSSI can weaken. In this example, the asset can select different predefined patterns to determine the distance based congestion level (e.g., the predefined patterns can be adjusted for a weaker RSSI when the congestion level is relatively high).

Figure 8:
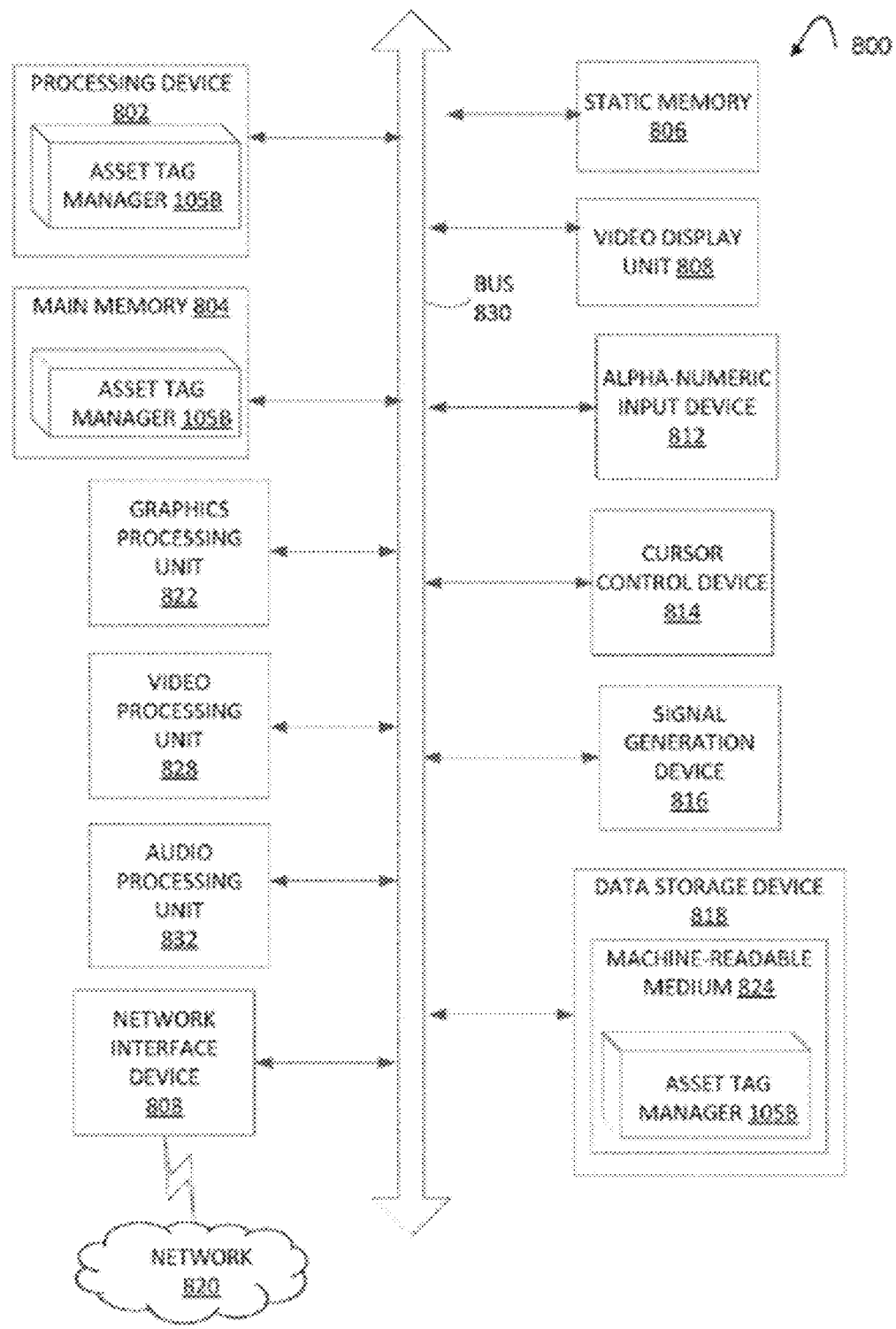
FIG. 8 illustrates a block diagram of a machine, according to one embodiment.

FIG. 8 illustrates a diagrammatic representation of a machine in the exemplary form of a computer system 800 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 822. The computer system 800 also may include a video display unit 808 (e.g., a liquid crystal display (LCD), a cathode ray tube (CRT), or a touch screen), an alphanumeric input device 810 (e.g., a keyboard), a cursor control device 814 (e.g., a mouse), and a signal generation device 816 (e.g., a speaker).

The data storage device 818 may include a machine-readable storage medium 824 on which is stored one or more sets of instructions 826 (e.g., software) embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting computer-readable storage media. The instructions 826 may further be transmitted or received over a network 820 via the network interface device 834.

While the machine-readable storage medium 824 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" can also be taken to include any medium that is capable of storing, encoding or carrying a set of instructions for execution by the machine and that cause the machine to perform any one or more of the methodologies of the present disclosure. The term "computer-readable storage medium" can accordingly be taken to include, but not be limited to, solid-state memories, optical media, and magnetic media.

In the foregoing description, numerous details are set forth. It can be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those that may use physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations can be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   scanning, by an asset tag manager executing by a processing device of an asset tag during a scanning window, for Bluetooth Low Energy (BLE) broadcasts from beacon devices located at fixed locations, wherein:
      a BLE broadcast comprises a beacon identifier in a data packet, and
      the asset tag manager is associated with an asset;
   filtering the BLE broadcasts, by the asset tag manager, to generate a subset of the BLE broadcasts, wherein the filtering is based on at least one of signal strength of the respective BLE broadcast or an identifier indicating an unapproved device having transmitted the BLE broadcast;
   identifying, by the asset tag manager, within the subset of the BLE broadcasts, a first BLE broadcast with a first data packet in view of an indication that a first beacon device is within a specified distance from the asset tag manager, the first beacon device having transmitted the first BLE broadcast;
   parsing, by the asset tag manager, the first data packet to locate a first beacon identifier associated with the first beacon device;
   creating, by the asset tag manager, a second data packet with the first beacon identifier and an asset tag identifier associated with the asset; and
   transmitting a wireless broadcast comprising the second data packet, the wireless broadcast to be received by a hub.

2. The method of claim 1, further comprising:
   identifying, by the asset tag manager, within the subset of the BLE broadcasts, a second BLE broadcast with a third data packet in view of the indication that a second beacon device is within a specified distance from the asset tag, the second beacon device having transmitted the second BLE broadcast;
   parsing, by the asset tag manager, the third data packet to locate a second beacon identifier associated with a the second beacon device; and
   creating, by the asset tag manager, the second data packet further comprising the second beacon identifier.

3. The method of claim 1, further comprising storing the subset of the BLE broadcasts in memory, wherein the subset of the BLE broadcasts are limited to a fixed number of the BLE broadcasts.

4. The method of claim 1, wherein the BLE broadcasts are advertisement broadcasts from the beacon devices at different fixed locations.

5. The method of claim 1, wherein parsing the first data packet to locate the first beacon identifier is at least in part performed as part of the filtering the BLE broadcasts or is at least in part performed during the scanning.

6. The method of claim 1, wherein filtering the BLE broadcasts comprises:
   comparing a received signal strength indicator (RSSI) of the BLE broadcast to an RSSI threshold; and
   filtering the BLE broadcast, when the received signal strength indicator (RSSI) of the BLE broadcast is below the RSSI threshold.

7. The method of claim 6, wherein filtering the BLE broadcasts further comprises:
parsing the data packet associated with the BLE broadcast for the identifiers, when the received signal strength indicator (RSSI) of the BLE broadcast is equal to or above the RSSI threshold; and
filtering the BLE broadcast, when one or more of the parsed identifiers indicates the BLE broadcast is from the unapproved device.

8. The method of claim 1, wherein the indication that the first beacon device is within the specified distance from the asset tag is the signal strength of the first BLE broadcast.

9. The method of claim 1, wherein the identifying further comprises:
determining a received signal strength indicator (RSSI) of a BLE broadcast of the subset of the BLE broadcasts;
sorting the subset of the BLE broadcasts in view of the received signal strength indicator (RSSI); and
selecting the first BLE broadcast with a highest RSSI.

10. The method of claim 1, wherein in the wireless broadcast that comprises the second data packet is transmitted using a wireless communication protocol of a low energy wireless personal area network (PAN) standard.

11. The method of claim 1, wherein the asset tag manager executes on the processing device within an asset tag device.

12. An asset tag device comprising:
an antenna for receiving and transmitting wireless broadcasts;
a processing device operatively coupled to the antenna; and
a memory coupled to the processing device and storing instructions of an asset tag manager, wherein the instructions, when executed, cause the processing device to:
scan, during a scanning window, for Bluetooth Low Energy (BLE) broadcasts from beacon devices located at fixed locations, wherein a BLE broadcast comprises a beacon identifier in a data packet, and wherein the asset tag manager is associated with an asset;
filter the BLE broadcasts to generate a subset of the BLE broadcasts, wherein the filtering is based on at least one of signal strength of the respective BLE broadcast or an identifier indicating an unapproved device having transmitted the BLE broadcast;
identify, within the subset of the BLE broadcasts, a first BLE broadcast with a first data packet in view of an indication that a first beacon device is within a specified distance from the asset tag manager, the first beacon device having transmitted the first BLE broadcast;
parse the first data packet to locate a first beacon identifier associated with a first beacon device;
create a second data packet with the first beacon identifier and an asset tag identifier associated with the asset; and
transmit a wireless broadcast comprising the second data packet, the wireless broadcast to be received by a hub.

13. The asset tag device of claim 12, the instructions further causing the processing device to:
identify, within the subset of the BLE broadcasts, a second BLE broadcast with a third data packet in view of the indication that a second beacon device is within a specified distance from the asset tag, the second beacon device having transmitted the second BLE broadcast;
parse the third data packet to locate a second beacon identifier associated with the second beacon device; and
create the second data packet further comprising the second beacon identifier.

14. The asset tag device of claim 12, wherein to filter the BLE broadcasts, the instructions further cause the processing device to:
compare a received signal strength indicator (RSSI) of the BLE broadcast to an RSSI threshold;
filter the BLE broadcast, when the received signal strength indicator (RSSI) of the BLE broadcast is below the RSSI threshold;
parse the data packet associated with the BLE broadcast for the identifiers, when the received signal strength indicator (RSSI) of the BLE broadcast is equal to or above the RSSI threshold; and
filter the BLE broadcast, when one or more of the parsed identifiers indicates the BLE broadcast is from the unapproved device.

15. The asset tag device of claim 12, wherein to identify, the instructions further cause the processing device to:
determine a received signal strength indicator (RSSI) of a BLE broadcast of the subset of the BLE broadcasts;
sort the subset of the BLE broadcasts in view of the received signal strength indicator (RSSI); and
select the first BLE broadcast with a highest RSSI.

16. A method comprising:
scanning, by an asset tag manager executing by a processing device of an asset tag during a scanning window, for first wireless broadcasts from beacon devices located at fixed locations, wherein:
a first wireless broadcast comprises a beacon identifier in a data packet,
the first wireless broadcast does not comprise Zigbee, Wi-Fi, radio-frequency identification (RFID), infrared, sonar, or ultrasound, and
the asset tag manager is associated with an asset;
filtering the first wireless broadcasts, by the asset tag manager, to generate a subset of the first wireless broadcasts, wherein the filtering is based on at least one of signal strength of the respective first wireless broadcast or an identifier indicating an unapproved device having transmitted the first wireless broadcast;
identifying, by the asset tag manager, within the subset of the first wireless broadcasts, a second wireless broadcast with a first data packet in view of an indication that a first beacon device is within a specified distance from the asset tag manager, the first beacon device having transmitted the second wireless broadcast;
parsing, by the asset tag manager, the first data packet to locate a first beacon identifier associated with the first beacon device;
creating, by the asset tag manager, a second data packet with the first beacon identifier and an asset tag identifier associated with the asset; and
transmitting a third wireless broadcast comprising the second data packet, the third wireless broadcast to be received by a hub.

17. The method of claim 16, further comprising:
identifying, by the asset tag manager, within the subset of the first wireless broadcasts, a fourth wireless broadcast with a third data packet in view of the indication that a second beacon device is within a specified distance from the asset tag, the second beacon device having transmitted the fourth wireless broadcast;

parsing, by the asset tag manager, the third data packet to locate a second beacon identifier associated with a the second beacon device; and creating, by the asset tag manager, the second data packet further comprising the second beacon identifier.

18. The method of claim 16, further comprising storing the subset of the first wireless broadcasts in memory, wherein the subset of the first wireless broadcasts are limited to a fixed number of the first wireless broadcasts.

19. The method of claim 16, wherein the first wireless broadcasts are advertisement broadcasts from the beacon devices at different fixed locations.

20. The method of claim 16, wherein parsing the first data packet to locate the first beacon identifier is at least in part performed as part of the filtering the first wireless broadcasts or is at least in part performed during the scanning.

21. The method of claim 16, wherein filtering the first wireless broadcasts comprises:
comparing a received signal strength indicator (RSSI) of the first wireless broadcast to an RSSI threshold; and
filtering the first wireless broadcast, when the received signal strength indicator (RSSI) of the first wireless broadcast is below the RSSI threshold.

22. The method of claim 21, wherein filtering the first wireless broadcasts further comprises:
parsing the data packet associated with the first wireless broadcast for the identifiers, when the received signal strength indicator (RSSI) of the first wireless broadcast is equal to or above the RSSI threshold; and
filtering the first wireless broadcast, when one or more of the parsed identifiers indicates the first wireless broadcast is from the unapproved device.

23. The method of claim 16, wherein the indication that the first beacon device is within the specified distance from the asset tag is the signal strength of the second wireless broadcast.

24. The method of claim 16, wherein the identifying further comprises:
determining a received signal strength indicator (RSSI) of a first wireless broadcast of the subset of the first wireless broadcasts;
sorting the subset of the first wireless broadcasts in view of the received signal strength indicator (RSSI); and
selecting the second wireless broadcast with a highest RSSI.

25. The method of claim 16, wherein in the third wireless broadcast is transmitted using a wireless communication protocol of a low energy wireless personal area network (PAN) standard.

26. The method of claim 16, wherein the asset tag manager executes on the processing device within an asset tag device.

27. An asset tag device comprising:
an antenna for receiving and transmitting wireless broadcasts;
a processing device operatively coupled to the antenna; and
a memory, coupled to the processing device and storing instructions of an asset tag manager, that the instructions, when executed, cause the processing device to:
scan, during a scanning window, for first wireless broadcasts from beacon devices located at fixed locations, wherein a first wireless broadcast comprises a beacon identifier in a data packet, wherein the first wireless broadcast does not comprise Zigbee, Wi-Fi, radio-frequency identification (RFID), infrared, sonar, or ultrasound, and wherein the asset tag manager is associated with an asset;
filter the first wireless broadcasts to generate a subset of the first wireless broadcasts, wherein the filtering is based on at least one of signal strength of the respective first wireless broadcast or an identifier indicating an unapproved device having transmitted the first wireless broadcast;
identify, within the subset of the first wireless broadcasts, a second wireless broadcast with a first data packet in view of an indication that a first beacon device is within a specified distance from the asset tag manager, the first beacon device having transmitted the second wireless broadcast;
parse the first data packet to locate a first beacon identifier associated with a first beacon device;
create a second data packet with the first beacon identifier and an asset tag identifier associated with the asset; and
transmit a third wireless broadcast comprising the second data packet, the third wireless broadcast to be received by a hub.

28. The asset tag device of claim 27, the instructions further causing the processing device to:
identify, within the subset of the first wireless broadcasts, a fourth wireless broadcast with a third data packet in view of the indication that a second beacon device is within a specified distance from the asset tag, the second beacon device having transmitted the fourth wireless broadcast;
parse the third data packet to locate a second beacon identifier associated with the second beacon device; and
create the second data packet further comprising the second beacon identifier.

29. The asset tag device of claim 27, wherein to filter the first wireless broadcasts, the instructions further cause the processing device to:
compare a received signal strength indicator (RSSI) of the first wireless broadcast to an RSSI threshold;
filter the first wireless broadcast, when the received signal strength indicator (RSSI) of the first wireless broadcast is below the RSSI threshold;
parse the data packet associated with the first wireless broadcast for the identifiers, when the received signal strength indicator (RSSI) of the first wireless broadcast is equal to or above the RSSI threshold; and
filter the first wireless broadcast, when one or more of the parsed identifiers indicates the first wireless broadcast is from the unapproved device.

30. The asset tag device of claim 27, wherein to identify, the instructions further cause the processing device to:
determine a received signal strength indicator (RSSI) of a first wireless broadcast of the subset of the first wireless broadcasts;
sort the subset of the first wireless broadcasts in view of the received signal strength indicator (RSSI); and
select the second wireless broadcast with a highest RSSI.

* * * * *